US012701365B1

(12) United States Patent
Salvatti et al.

(10) Patent No.: US 12,701,365 B1
(45) Date of Patent: Aug. 4, 2026

(54) AUDIO TRANSDUCER WITH HIGH ASPECT RATIO ACTUATOR

(71) Applicant: Amazon Technologies, Inc., Seattle, WA (US)

(72) Inventors: Alexander Victor Salvatti, Sunnyvale, CA (US); Wei Yang, Cambridge, MA (US); Douglas K. Hogue, Bellevue, WA (US); Richard Warren Little, Bellevue, WA (US); Lakshmikanth Tipparaju, Sunnyvale, CA (US); Tommaso Nizzoli, Reggio Emilia (IT); Kai Zhang, Seattle, WA (US); Lijuan Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 18/614,002

(22) Filed: Mar. 22, 2024

Related U.S. Application Data

(60) Provisional application No. 63/453,810, filed on Mar. 22, 2023.

(51) Int. Cl.

| | |
|---|---|
| ***H04R 9/06*** | (2006.01) |
| ***H04R 1/02*** | (2006.01) |
| ***H04R 9/02*** | (2006.01) |
| ***H04R 9/04*** | (2006.01) |

(52) U.S. Cl.
CPC ............... *H04R 9/06* (2013.01); *H04R 1/025* (2013.01); *H04R 9/025* (2013.01); *H04R 9/045* (2013.01); *H04R 2400/11* (2013.01)

(58) Field of Classification Search
None
See application file for complete search history.

(56) References Cited

U.S. PATENT DOCUMENTS

2003/0103642 A1* 6/2003 Kam ...................... H04R 9/043 381/431
2009/0257617 A1* 10/2009 Ikeda ..................... H04R 31/00 29/829
2015/0350775 A1* 12/2015 Behles ................... H04R 3/002 381/354

* cited by examiner

*Primary Examiner* — Walter F Briney, III
(74) *Attorney, Agent, or Firm* — Eversheds Sutherland (US) LLP

(57) ABSTRACT

A device includes a speaker a housing in which the speaker is at least partially disposed. The speaker includes a cone, a surround disposed around the cone, and a former having a first surface and a second surface with a flat coil. The speaker further includes an actuator having a first magnetic assembly disposed adjacent to the first surface and a second magnetic assembly disposed adjacent to the second surface. The first magnetic assembly has a first magnetic element and a second magnetic element. The second magnetic assembly includes a third magnetic element and a fourth magnetic element. A first post and a second post couple to the former, a first metal flexure couples to the first post, and a second metal flexure couples to the second post.

17 Claims, 28 Drawing Sheets

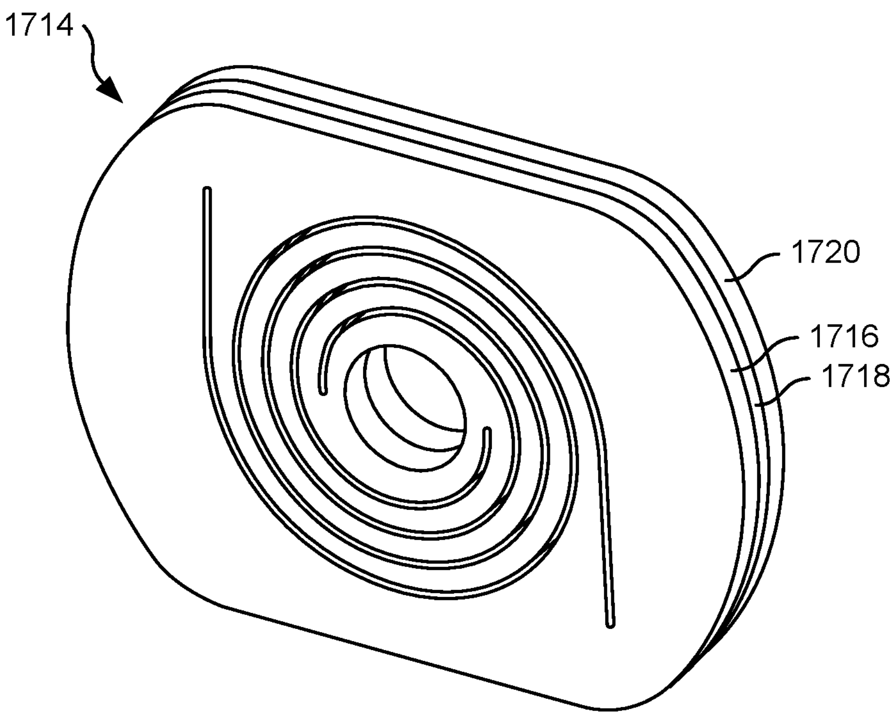
FIG. 17C
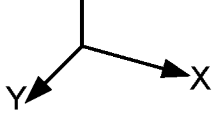

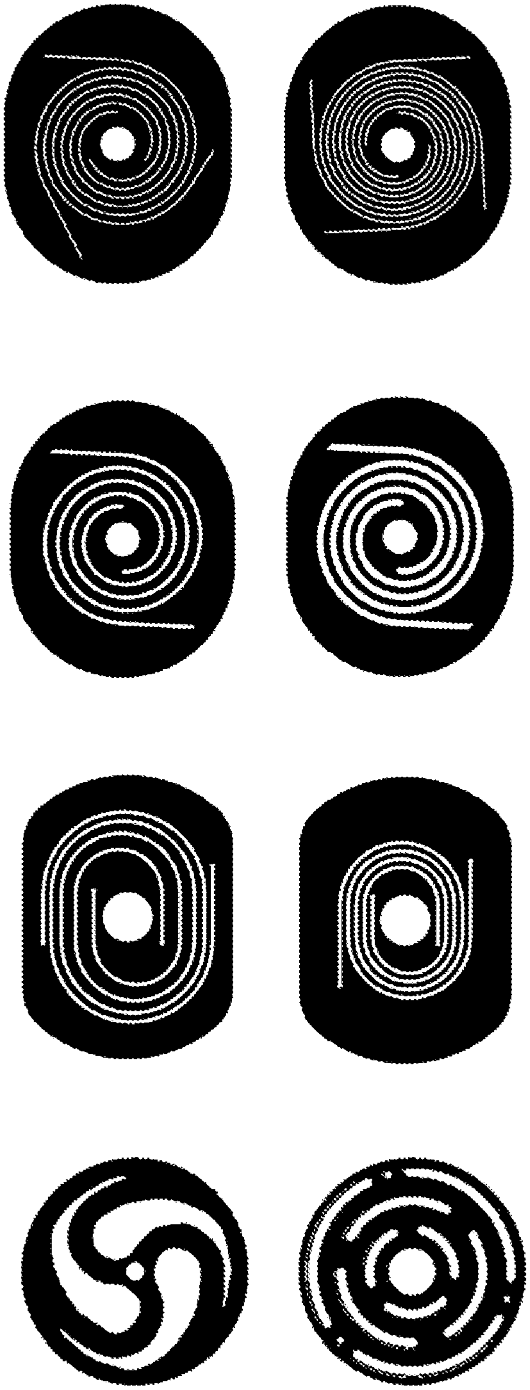
FIG. 18
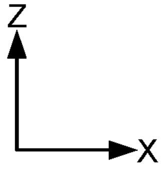

AUDIO TRANSDUCER WITH HIGH ASPECT RATIO ACTUATOR

CROSS-REFERENCE TO RELATED APPLICATIONS

This application claims priority to U.S. Provisional Application No. 63/453,810, filed Mar. 22, 2023, entitled "High Aspect Ratio Driver," the entirety of which is herein incorporated by reference.

BACKGROUND

Electronic devices, such as televisions, smart-home devices, and the like are becoming increasingly compact or constrained in a given spatial dimension to suit the requirement of aesthetics, industrial design, or other desires of the product designers. For example, electronic devices are often equipped with greater functionalities contained in a smaller volume. Unfortunately, the performance of some components is sacrificed and/or components are unavailable for these smaller volumes. Speakers, for example, are often large in size and therefore are ill-suited for such compact applications, due to the fact that to make sound, a speaker must move air. This problem is worsened when producing low frequency sounds at a desired volume level when product dimensions are constrained.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 17C illustrates a third example of a flexural spring, according to examples of the present disclosure.

FIG. 18 illustrates alternate embodiments of a flexural spring, according to examples of the present disclosure, as well as examples of prior art.

DETAILED DESCRIPTION

Figure 1:
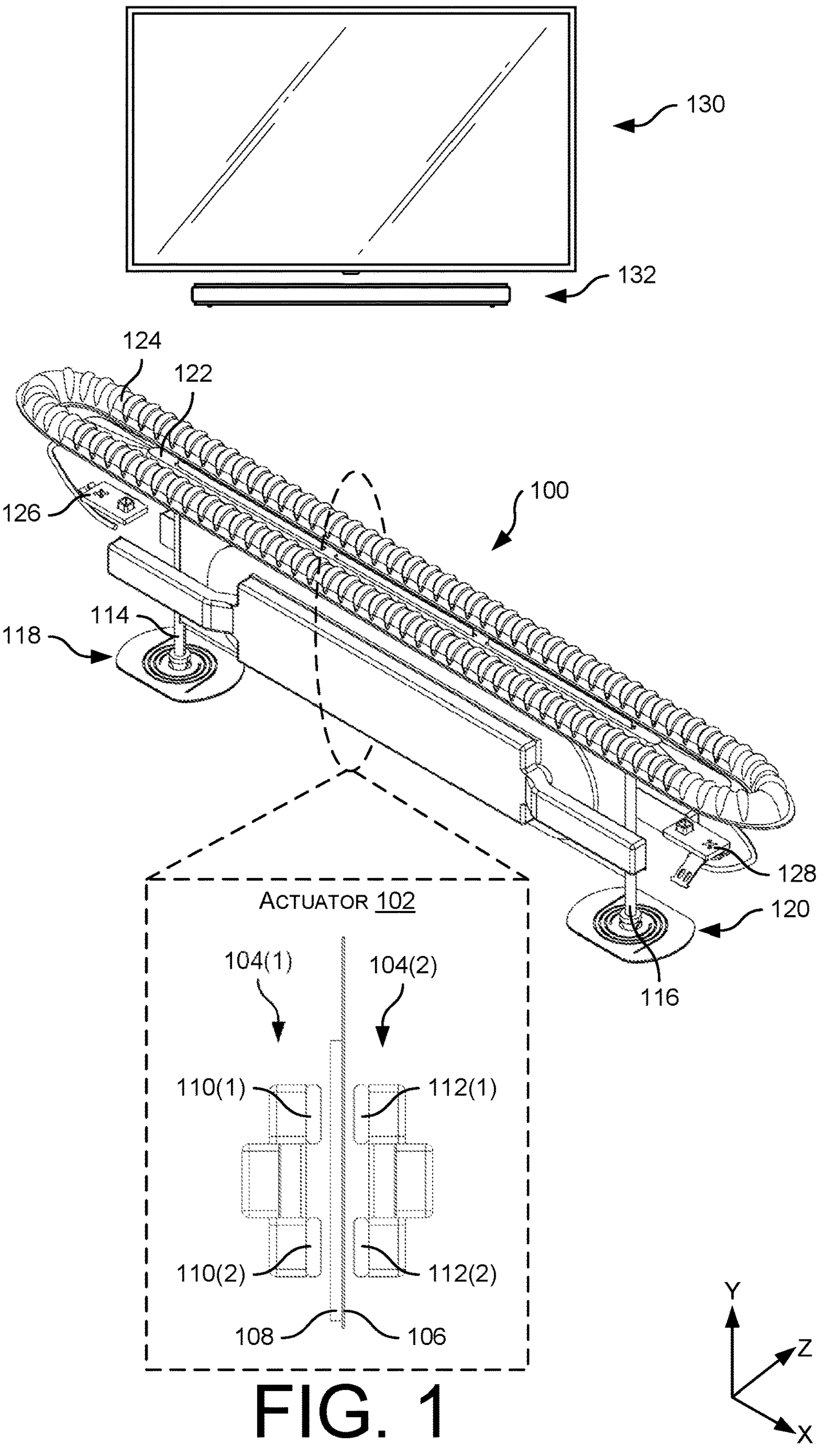
FIG. 1 illustrates an example speaker having a high-aspect ratio actuator, according to examples of the present disclosure.

This application is directed, at least in part, to a speaker having an audio transducer, with a high aspect ratio, according to examples of the present disclosure. Compared to conventional audio transducers found in the overwhelming majority of the market, which have a round shape, the audio transducer described herein may be rectangular shaped. Generically, in audio transducers, a "high aspect ratio" refers to a design where the length to width ratio of the acoustically radiating surface exceeds approximately 3:1. The higher the aspect ratio becomes, the more difficult it becomes to design the component, especially if it must also be a high-excursion design where the reciprocating diaphragm is intended to move a significantly large distance, as is the case when low frequencies are reproduced. In some instances, the audio transducer may include an actuator having a first magnetic assembly, a second magnetic assembly, and a voice-coil, which may be coupled to a former. The first magnetic assembly, which is disposed on a first side of the voice-coil, includes a plate having two magnetic elements. The second magnetic assembly, which is disposed on a second side of the voice-coil, includes a plate having two magnetic elements. In some instances, the voice-coil may be disposed on one side of the former. The magnetic elements disposed across the first magnetic assembly and the second magnetic may be attractive to one another and generate a magnetic field across an air-gap, interacting with the voice-coil, in order to produce sound generated by the audio transducer. In some instances, the voice-coil couples to a first post at a first end and a second post at a second end. The first post and the second post may be coupled to flexural springs to provide a suspension function to the moving parts of the actuator. Moreover, components of the audio transducer may couple to a frame. As compared to conventional round drivers of an equivalent volume displacement, the actuator may be compact without sacrificing bass and performance characteristics.

The actuator may include two halves. In some instances, the first magnetic assembly may represent a first half of the actuator, while the second magnetic assembly may represent a second half of the actuator. The voice-coil is disposed between the first half and the second half of the actuator. In other words, the voice-coil may be interposed between the first half and the second half of the actuator.

The first magnetic assembly may include a ferromagnetic plate, intended to focus the magnetic energy from the magnetic element(s) and direct the flux to the area near the voice-coil windings. In some instances, the first magnetic assembly has a plate, a first arm, and a second arm that extend from the plate. The plate may be disposed between the first arm and the second arm. The plate may be manufactured from steel or another ferromagnetic material. The first magnetic assembly also includes a first magnetic element (e.g., ferrous material, permanent magnet, electromagnet, etc.)) and a second magnetic element (e.g., ferrous material, permanent magnet, electromagnet, etc.)), which are disposed on the plate. The first magnetic element and the second magnetic element may be spaced apart from one another. For example, the first magnetic element may be disposed proximate to a top of the plate and the second magnetic element may be disposed proximate to a bottom of the plate. A gap distance may be disposed between the first magnetic element and the second magnetic element. As will be explained herein, the first arm and the second arm of the first magnetic assembly may couple to the frame of the audio transducer. In some instances, the plate, the first arm, and the second arm are formed form a continuous piece of material (e.g., steel).

The second magnetic element includes similar components as the first magnetic assembly. For example, second magnetic assembly may include the plate, which in some instances, has a plate and a first arm and a second arm that extend from the plate. The plate may be disposed between the first arm and the second arm. The plate may be manufactured from steel or another ferromagnetic material. The second magnetic assembly also includes a first magnetic element and a second magnetic element, which are disposed on the plate. The first magnetic element and the second magnetic element may be spaced apart from one another. For example, the first magnetic element may be disposed proximate to a top of the plate and the second magnetic element may be disposed proximate to a bottom of the plate. A gap distance may be disposed between the first magnetic element and the second magnetic element. As will be explained herein, the first arm and the second arm of the second magnetic assembly may couple to the frame of the audio transducer. In some instances, the first magnetic assembly is the same as the second magnetic assembly. In some instances, the plate, the first arm, and the second arm are formed form a continuous piece of material (e.g., ferromagnetic steel).

In some instances, the actuator has a total magnet volume (e.g., the combined magnetic elements of the first magnetic assembly and the second magnetic assembly) of approximately six cubic centimeters (cc). The magnetic elements of the first magnetic assembly and the second magnetic assembly may represent thin bar magnets made from neodymium-iron-boron (NdFeBe) or a similar high-energy material if the goal is to minimize the amount of magnet material used, or alternatively the magnets could be selected from lower-energy/lower-cost material such as ceramic ferrite or other magnetic material. For example, the magnetic elements may be rectangular shaped. In some instances, the magnetic elements may be differently shaped and/or sized. Moreover, the magnetic elements may be coupled to other bodies, bases, etc. than the plate having the first arm and the second arm. The magnetic assemblies may also include more than or less than two of the magnetic elements, respectively.

When coupled to the frame, the first magnetic element and the second magnetic element of the first magnetic assembly may be oriented towards the voice-coil, and the first magnetic element and the second magnetic element of the second magnetic assembly may be oriented towards the voice-coil. The first magnetic element of the first magnetic assembly and the first magnetic element of the second magnetic assembly may be polarized such that they attract one another to enable magnetic flux to cross the air-gap where the voice-coil is disposed. The attraction may generate a magnetic flux that flows from the first magnet of the first magnetic assembly to the first magnet of the second magnetic assembly, through the former and/or the voice-coil. Additionally, the second magnet of the first magnetic assembly and the second magnet of the second magnetic assembly may be attractive to one another. The attraction may generate a magnetic flux that flows from the second magnet of the second magnetic assembly to the second magnet of the first magnetic assembly, through the former and/or the voice-coil. The coupling of the first magnetic assembly and the second magnetic assembly to the frame may maintain a spacing (e.g., gap) between the first magnetic assembly and the second magnetic assembly. In other words, the frame may resist a force of attraction between the magnetic elements of the first magnetic assembly and the magnetic elements of the second magnetic assembly.

For example, a first air gap may be disposed between the voice-coil and the magnetic elements of the first magnetic assembly. A second air gap may be disposed between the voice-coil and the magnetic elements of the second magnetic assembly. The first air gap and the second air gap permits the voice-coil to translate, move, vibrate, etc. in order for sound to be generated by the speaker. The coupling of the first magnetic assembly and the second magnetic assembly to the frame maintains the first air gap and the second air gap, thereby preventing the attractive force between first magnetic assembly and the second magnetic assembly contacting the former and/or the voice-coil.

In some instances, the voice-coil may be coupled to the former, which may provide support to the voice-coil. In other instances, the former may be omitted. The voice-coil, which may represent a flat coil or a flat racetrack coil. In instances, in which the voice-coil couples to the former, the voice-coil may be disposed on a first side of the former oriented towards the first magnetic assembly. A second side of the former, opposite the first side, may be oriented towards the second magnetic assembly.

The voice-coil design may result in various design choices affecting the shape, size, connectivity, materials, layout, and configuration, which may affect the number of coil layers, the quantity of coils, their placement, etc. as selected by the designer to achieve various ends such as cost, performance, size, etc. A first portion of the voice-coil (e.g., track, leg, section, etc.) may be disposed between the first magnetic element of the first magnetic assembly and the first magnetic element of the second magnetic assembly. A second portion (e.g., track, leg, section, etc.) may be disposed between the second magnetic element of the first magnetic assembly and the second magnetic element of the second magnetic assembly. A gap is disposed between the first portion and the second portion. Terminals may connect to the voice-coil, and current may be supplied to the voice-coil to adjust a polarity of the magnetic field to vibrate the voice-coil and cause sound to be produced via the Lorentz force.

While the embodiment described herein is known as a moving-coil design, it is envisioned that an alternative embodiment known as a moving-magnet design may also benefit from this invention. In this case, the voice-coil may be coupled to the frame, and the magnetic elements may be moving proximate to the voice-coil. In some instances, benefits of the moving-magnetic element embodiment may include an ability to better heatsink the voice-coils, and a higher moving mass which may be desirable in some cases.

The former, as introduced above, includes the first end and the second end. The first post may include a groove in which at least a portion of the first end of the former is disposed. The second post may include a groove in which at least a portion of the second end of the former is disposed. The coupling of the former to the first post and the second post may increase a structural rigidity of the former and the voice-coil. For example, the coupling of the former to the first post and the second post may permit a more controlled movement (or motion) of the former and the voice-coil in a single direction (e.g., back and forth between the first magnetic assembly and the second magnetic assembly). The first post and/or the second post may resemble a connecting rod, mechanical connector, coupler, etc. However, in some instances, the voice-coil may directly couple to the first post and the second post, respectively. For example, in instances in which the former is omitted, the voice-coil may couple to the first post at a first end (e.g. within the groove), while the voice-coil may couple to the second post at a second end (e.g., within the groove).

The first post and the second post may be coupled to flexural springs (e.g., metal flexures), which may represent flat springs or flexural springs chemically etched, water jetted, stamped, laser cut, etc. formed in a piece of material. For example, an end of the first post may be coupled to a first flexural spring and an end of the second post may be coupled to a second flexural spring to provide a suspension to the actuator's moving parts. The first flexural spring and the second flexural spring may also be coupled to the frame. The coupling of the former and/or the voice-coil to the first flexural spring and the second flexural spring may provide a suspension to encourage motion in a particular axis, greatly reducing undesired motion in other degrees of freedom such as undesired rotations and translations. For example the first flexural spring and the second flexural spring may provide upward and downward strokes to the first post and the second post (Y-axis motion) while restricting motion in the X-axis and/or Z-axis. The first flexural spring and the second flexural spring are coupled to the frame on either side of the magnetic assemblies.

In some instances, the use of the flexural springs may be used instead of traditional spiders (e.g., spider cloth) due the high excursion requirement and structural integrity requirements (e.g., high stress, high cycle fatigue, high radial stiffness and low axial stiffness) of the actuator. The flexural springs may include any number of cutout slots with any kind of pattern shape like arms, loops, coils, etc. As will be discussed herein, while the figures show a flexural spring that is a planar shape in XZ, this is only illustrative and the flexure may take other forms which extend out of the XZ plane, such as features that undulate, spiral, etc. The flexure need not be a uniform thickness, but may have areas which are locally thinner or thicker in order to tailor desirable performance characteristics that may lower mechanical stress, increase fatigue life, etc. Additionally, the flexural springs may include a cutout slot having spiral shape with either a constant pitch, or non-constant pitch. In some instances, the flexural springs may be formed from suitable materials such as spring steel, beryllium copper (BeCu), titanium alloys, etc.

In some instances, dampening may be added to avoid audible noise and/or prevent mechanical resonances detrimental to the function of the actuator. For example, pressure sensitive adhesives (PSA) may be coupled to a piece of material from which the flexural springs are formed. The PSA may include the same geometry as the metal that forms the flexural spring. The PSA may be die-cut in order to have the same geometry (including cutout slots) as the flexural spring. In some instances, the thickness of the PSA may be same as or different than the metal. Any number of layers of the PSA may be included, and/or layers of the metal that form the flexural springs. The PSA, which serves as a damping layer, may be selectively applied to only particular regions within the body of the flexural spring. Other variations to the design may be made to yield desirable characteristics, such as adding localized mass in particular areas of the flexure which may favorably dynamically balance the design to reduce undesired local resonances that could lead to a reduced lifespan or undesirable noise emissions.

The audio transducer, or more generally a speaker employing the audio transducer, may include additional components, such as a cone and a surround disposed around the cone. The cone and the surround may be coupled to the frame and provide a suspension to the moving parts of the actuator. For example, as the audio transducer produces sound and the surround flexes, the cone may move. In some instances, the cone may define one or more slots in which tabs of the former are disposed for providing support to the former. In some instances, the audio transducer may be substantially rectangular shaped. Additionally, the audio transducer may be at least partially disposed in a housing that provide acoustic back volume.

In some instances, the actuator may be embodied within various types of electronic devices, such as televisions, smart home devices, sound bars, etc. In some instances, the actuator may be included within various types of speakers, such as a subwoofers, however, the speaker may represent other types of speakers such as woofers, or full-range which cover different frequency ranges of the audio or tactile bands. In some instances, the actuator may be included within physically narrow applications and provide strong bass performance from a subwoofer. For example, the actuator may include a width of approximately 27 mm and a length of approximately 300 mm. In some instances, the actuator has an aspect ratio of 11:1. Additionally, or alternatively, the actuator may have an excursion of +/−8 mm or more.

While the most common application of this invention is likely related to speakers which directly move air to provide sound, it is equally applicable to other applications such as vibration actuators, shakers, and similar devices where mechanical forces rather than sound is the primary desired output field. For this reason, the more generic term "transducer" can be used since a transducer converts energy from one form to another, in this case electrical signal to sound, or electrical signal to force. Thus the more generic term "actuator" may also be applied to generically cover both cases.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example audio transducer 100 including an actuator 102 having a high aspect ratio, according to examples of the present disclosure. Details of the actuator 102 are discussed herein, however, the actuator 102 may include magnetic assemblies 104, which may represent driving components of the actuator 102. For example, the actuator 102 may include a first magnetic assembly 104(1) disposed on a first side of a voice-coil 108 and a second magnetic assembly 104(2) disposed on a second side of the voice-coil 108 opposite the first side of the voice-coil 108 (e.g., spaced apart in the Z-direction). In some instances, the voice-coil 108 may be coupled to a former 106, where the first magnetic assembly 104(1) may be disposed on a first side of the former 106, and the second magnetic assembly 104(2) may be disposed on a second side of the former 106.

The first magnetic assembly 104(1) may have magnetic elements 110 and the second magnetic assembly 104(2) may have magnetic elements 112 that create a magnetic field for causing sound to be generated by the audio transducer 100. For example, the first magnetic assembly 104(1) may have a first magnetic element 110(1) and a second magnetic element 110(2), and the second magnetic assembly 104(2) may have a first magnetic element 112(1) and a second magnetic element 112(2). The magnetic elements 110 of the first magnetic assembly 104(1) may be attractive to the magnetic elements 112 of the second magnetic assembly 104(2). For example, the first magnetic element 110(1) and the first magnetic element 112(1) may be attractive to one another. The attraction may generate a magnetic flux that flows from the first magnetic element 110(1) to the first magnetic element 112(1). Additionally, the second magnetic element 110(2) and the second magnetic element 112(2) may be attractive to one another. The attraction may generate a magnetic flux that flows from the second magnetic element 112(2) to the second magnetic element 110(2).

A first air gap may be disposed between the voice-coil 108 and the magnetic elements 110 of the first magnetic assembly 104(1). A second air gap may be disposed between the voice-coil 108 and the magnetic elements 112 of the second magnetic assembly 104(2). The first air gap and the second air gap permits the voice-coil 108 and/or the former 106 to translate, move, vibrate, etc. to produce sound. In some instances, the first air gap and the second air gap may be the same.

The audio transducer 100 may also include a first post 114 (e.g., connecting rod, coupler, connector, etc.) and a second post 116 (e.g., connecting rod, coupler, connector, etc.) coupled to the former 106. The first post 114 may couple a first end of the former 106 and the second post 116 may couple to a second end of the former 106 opposite the first end of the former 106 (e.g., spaced apart in the X-direction). However, although described as coupling to the former 106, in some instances, the voice-coil 108 may couple directly to the first post 114 and the second post 116, without the use of the former 106.

The audio transducer 100 includes metal flexures, such as a first flexural spring 118 and a second flexural spring 120, that couple to the first post 114 and the second post 116, respectively. The first flexural spring 118 and the second flexural spring 120 may provide a suspension to the moving parts of the actuator 102. For example, the first flexural spring 118 and the second flexural spring 120 may permit the first post 114 and/or the second post 116 to move up and down (e.g., in the Y-direction), rotate about one or more axes (e.g., pivot about the X, Z, and/or Z-axis), and so forth, according to the desired degrees of freedom to be allowed, which is some cases may be one (e.g., motion along the Y-axis), and in other cases may include others, such as rotation about the Y-axis depending on the design of the post and flexure.

Although not shown, the actuator 102, the first flexural spring 118, the second flexural spring 120, as well as other components of the audio transducer 100, such as a cone 122 and a surround 124 may couple to a frame. The coupling of the actuator 102, such as the first magnetic assembly 104(1) and the second magnetic assembly 104(2) to the frame may maintain a spacing (e.g., gap) between the first magnetic assembly 104(1) and the second magnetic assembly 104(2) (e.g., in the Z-direction). The frame may resist a force of attraction between the magnetic elements 110 of the first magnetic assembly 104(1) and the magnetic elements 112 of the second magnetic assembly 104(2), thereby holding the first magnetic assembly 104(1) and the second magnetic assembly 104(2) apart and preventing the first magnetic assembly 104(1) and the second magnetic assembly 104(2) contacting the former 106 and/or the voice-coil 108.

The audio transducer 100 may include a first terminal 126 and a second terminal 128, which couple to the voice-coil 108. The audio transducer 100 may find use within various devices. For example, the audio transducer 100 may be used within a television 130, a sound bar 132, etc. In some instances, the audio transducer 100 may find use within devices having slim or narrow profiles. For example, given the high aspect ratio of the actuator 102, the audio transducer

100 may be used within the television 130 having thin or slim profiles, for example, in an outer bezel area where the depth is highly constrained.

Figure 2A:
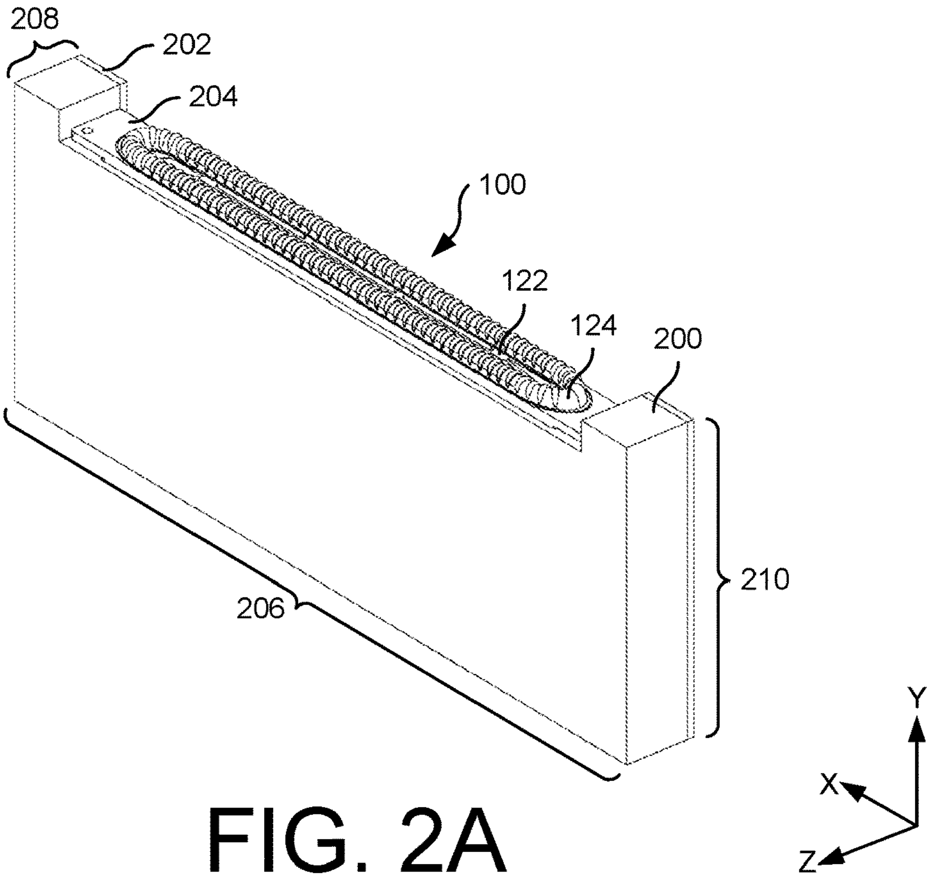
FIG. 2A illustrates a first isometric view of the speaker of FIG. 1 being disposed within a housing, according to examples of the present disclosure.
Figure 2B:
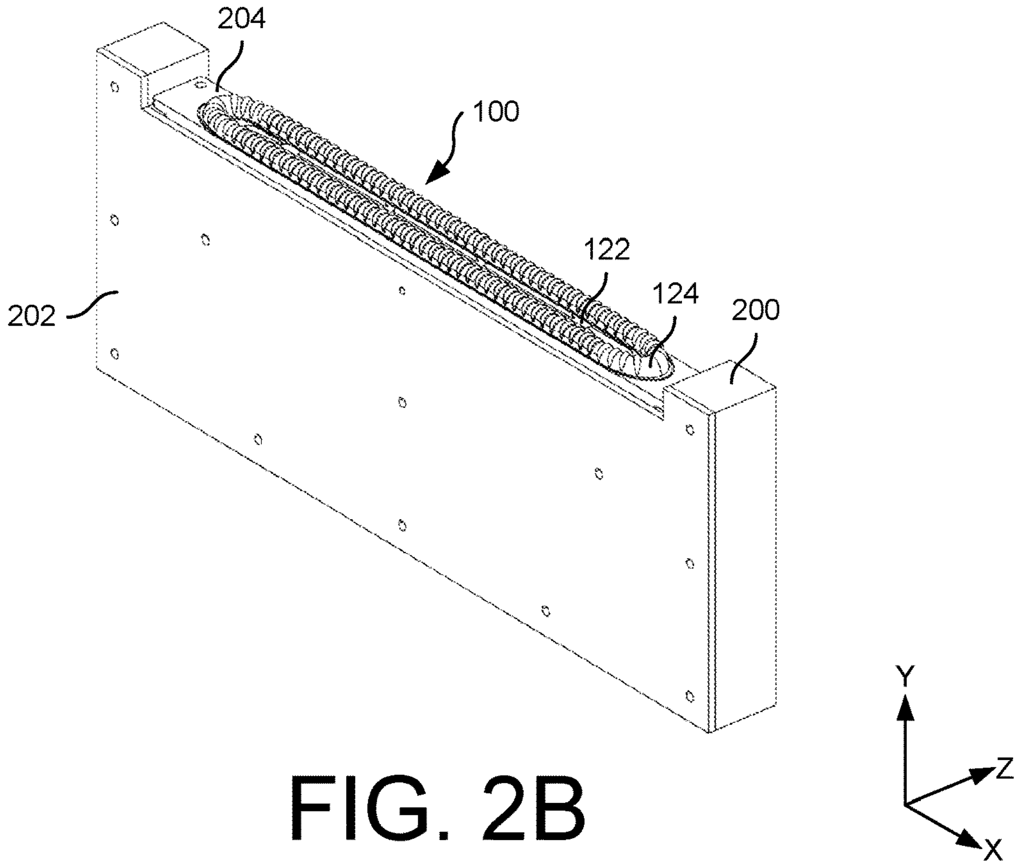
FIG. 2B illustrates a second isometric view of the speaker of FIG. 1 being disposed within the housing of FIG. 2A, according to examples of the present disclosure.

FIGS. 2A and 2B illustrate the audio transducer 100 coupled a housing 200, according to examples of the present disclosure. The housing 200 may define a cavity that provides back volume to the audio transducer 100. In some instances, a cover 202 (e.g., plate) may couple to the housing 200 to provide access to, and to enclose, the cavity. The cover 202 may couple to the housing 200 via fasteners, snap-fits, pressure-fits, adhesive, etc. In some instances, a gasket may be disposed between an interface of the housing 200 and the cover 202. The cone 122, the surround 124, and/or additional components, such as a dust cap, may be at least partially disposed external to the housing 200.

The audio transducer 100 may also include a frame 204 that couples the audio transducer 100 to the housing 200. For example, the frame 204 may couple to the housing 200. In some instances, the frame 204 may be at least partially disposed outside of the cavity and/or at least partially disposed inside of the cavity.

As shown, the housing 200 may include a substantially rectangular shape. The housing 200, or more generally, the audio transducer 100, may include a length 206 (e.g., in the X-direction), a depth 208 (e.g., in the Z-direction), and a height 210. The height 210 may be greater than the depth 208, and the depth 208 may be less than the length 206. Although a certain shape of the audio transducer 100 is shown, other shapes are envisioned.

Figure 3:
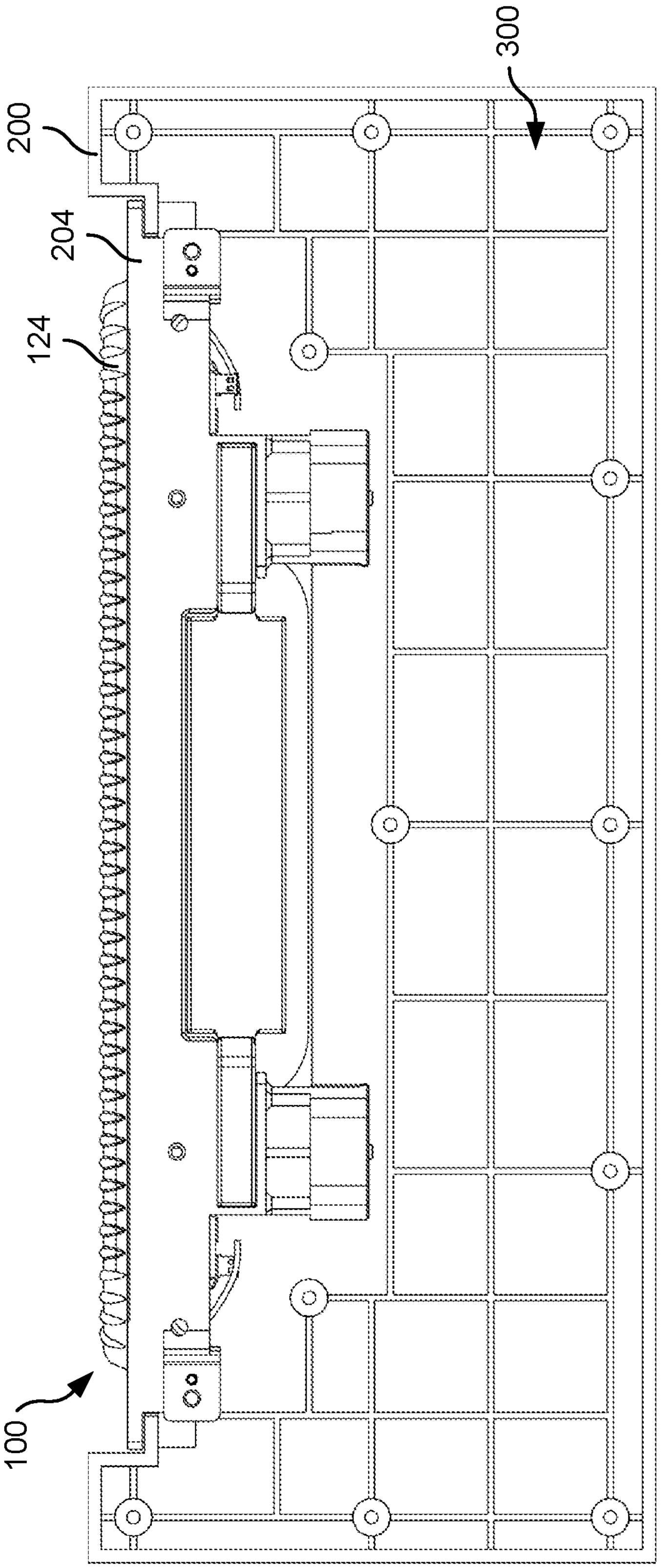
FIG. 3 illustrates the speaker of FIG. 1 disposed within the housing of FIG. 2A, according to examples of the present disclosure.
Figure 3:
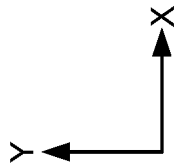

FIG. 3 illustrates an interior view of the housing 200, according to examples of the present disclosure. The housing 200 may define a cavity 300 in which the audio transducer 100 is at least partially disposed. The cavity 300 may be enclosed via the cover 202 (not shown in FIG. 3). The cavity 300 may provide acoustic back volume to the audio transducer 100.

The audio transducer 100 is shown including the frame 204 to which components of the audio transducer 100 are coupled. For example, the magnetic assemblies 104, the surround 124, etc. may couple to the frame 204. As shown, certain components of the audio transducer 100 may be disposed within the cavity 300, and certain components of the audio transducer 100 may be disposed external to the cavity 300 (e.g., the surround). The frame 204 may also be disposed within and external to the cavity 300. The frame 204 may couple to the housing 200 via fasteners, snap-fits, etc.

Figure 4A:
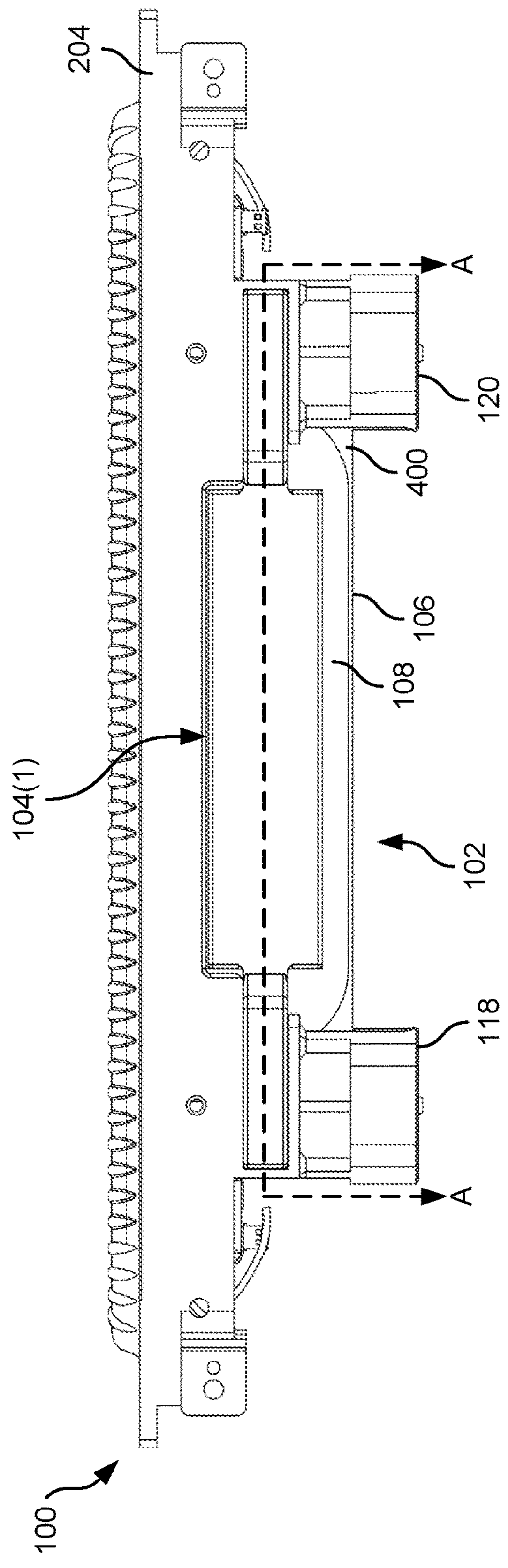
FIG. 4A illustrates a first side view of the actuator of FIG. 1, according to examples of the present disclosure.
Figure 4B:
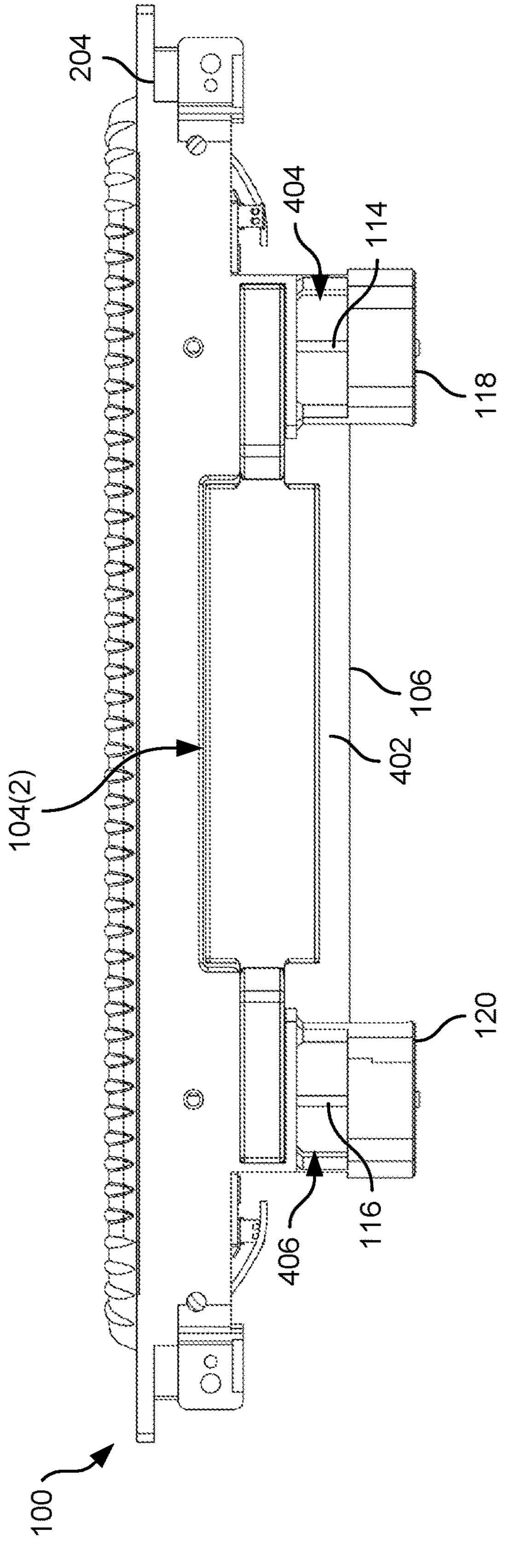
FIG. 4B illustrates a second side view of the actuator of FIG. 1, according to examples of the present disclosure.

FIGS. 4A and 4B illustrate details of the audio transducer 100, according to examples of the present disclosure. The actuator 102 couples to the frame 204. For example, the first magnetic assembly 104(1) may couple to a first side of the frame 204, and the second magnetic assembly 104(2) may couple to a second side of the frame 204 (e.g., spaced apart in the Z-direction). As will be discussed herein, the magnetic elements 110 of the first magnetic assembly 104(1) may be disposed adjacent to the voice-coil 108, such as adjacent to a first side 400 of the former 106. The magnetic elements 112 of the second magnetic assembly 104(2) may be disposed adjacent to a second side 402 of the former 106 (opposite the first side 400, in the Z-direction). However, although shown and described as being coupled to the former 106, in some instances, the former 106 may be omitted. In such instances, the first magnetic assembly 104(1) and the second magnetic assembly 104(2) may be described with reference to the voice-coil 108.

The first post 114 and the second post 116 couple to the former 106. The first post 114 and the second post 116 may be at least partially disposed within compartments (e.g., channels, passages, etc.) formed by the frame 204. For example, the first post 114 may be at least partially disposed within a first compartment 404 of the frame 204, and the second post 116 may be at least partially disposed within a second compartment 406 of the frame 204. The first post 114 may couple to the first flexural spring 118, which couples to or is disposed at an end of the first compartment 404. Likewise, the second post 116 may couple to the second flexural spring 120, which couples to or is disposed at an end of the second compartment 406. In instances in which the former 106 is omitted, the voice-coil 108 may couple to the first post 114 and the second post 116.

Figure 5:
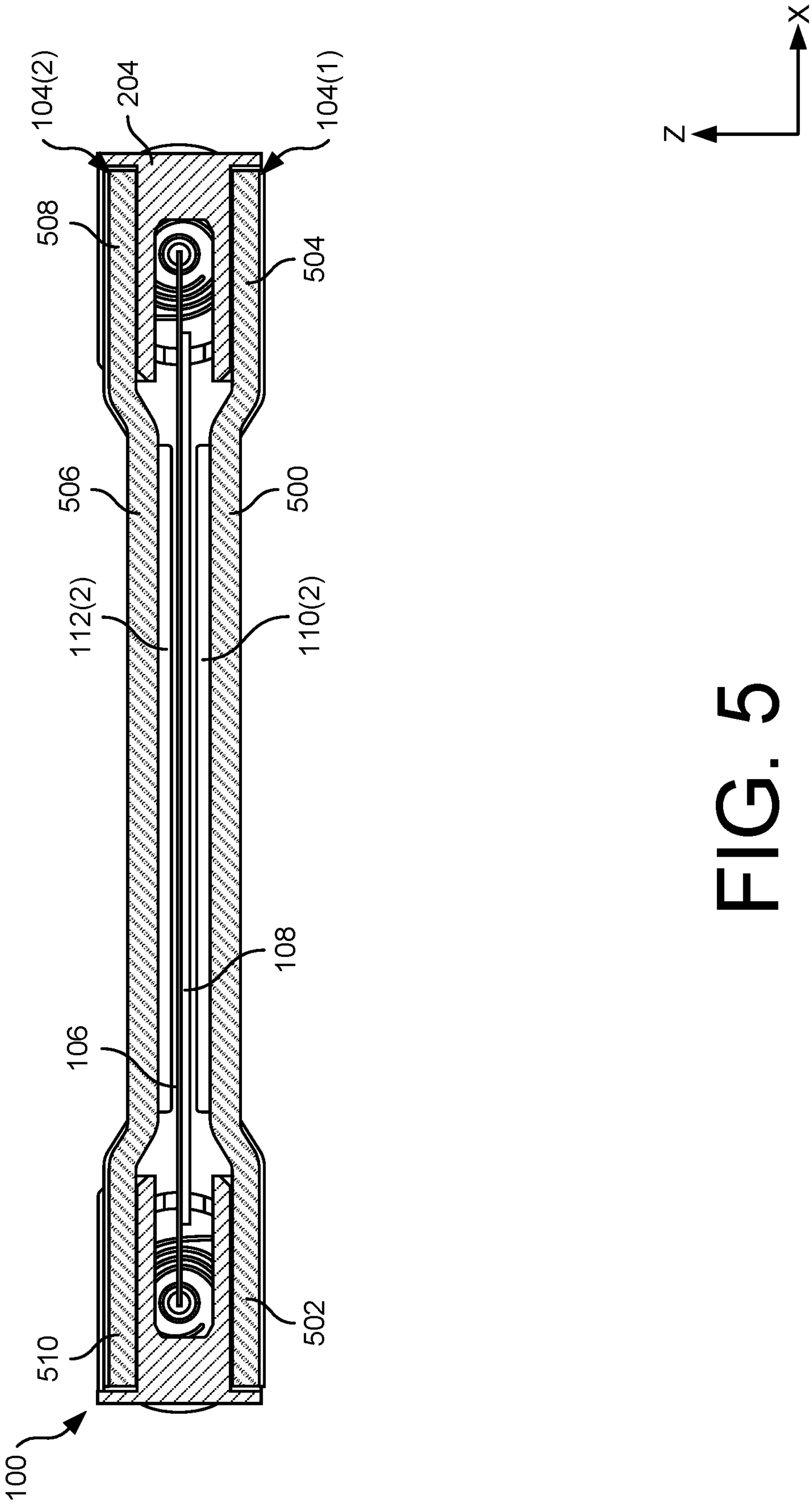
FIG. 5 illustrates a partial cross-sectional view of the actuator of the FIG. 1, taken along line A-A of FIG. 4A, according to examples of the present disclosure.

FIG. 5 illustrates a partial cross-sectional view of the actuator 102, taken along line A-A of FIG. 4A, according to examples of the present disclosure. The first magnetic assembly 104(1) includes a plate 500 to which the magnetic elements 110 couple. For example, as shown in FIG. 5, the second magnetic element 110(2) may couple to the plate 500. The first magnetic assembly 104(1) also includes a first arm 502 and a second arm 504 that couple to the frame 204. The first arm 502 and the second arm 504 may extend from the plate 500, such as opposing ends thereof. As will be explained herein, the first arm 502 and the second arm 504 may be disposed within receptacles of the frame 204. The coupling of the first magnetic assembly 104(1) to the frame 204 maintains a position of the first magnetic assembly 104(1) and spaces the first magnetic assembly 104(1) apart from the second magnetic assembly 104(2), the voice-coil 108, and/or the former 106. In other words, as the magnetic elements 110 of the first magnetic assembly 104(1) attract with the magnetic elements 112 of the second magnetic assembly 104(2), the frame 204 may hold the first magnetic assembly 104(1) and the second magnetic assembly 104(2) apart.

The second magnetic assembly 104(2) includes a plate 506 to which the magnetic elements 112 couple. For example, as shown in FIG. 5, the second magnetic element 112(2) may couple to the plate 506. The second magnetic assembly 104(2) includes also includes a first arm 508 and a second arm 510 that couple to the frame 204. The first arm 508 and the second arm 510 may extend from the plate 506, such as opposing ends thereof, which may be disposed within receptacles of the frame 204. The coupling of the second magnetic assembly 104(2) to the frame 204 maintains a position of the second magnetic assembly 104(2) and spaces the second magnetic assembly 104(2) apart from the first magnetic assembly 104(1), the voice-coil 108, and/or the former 106.

Figure 6A:
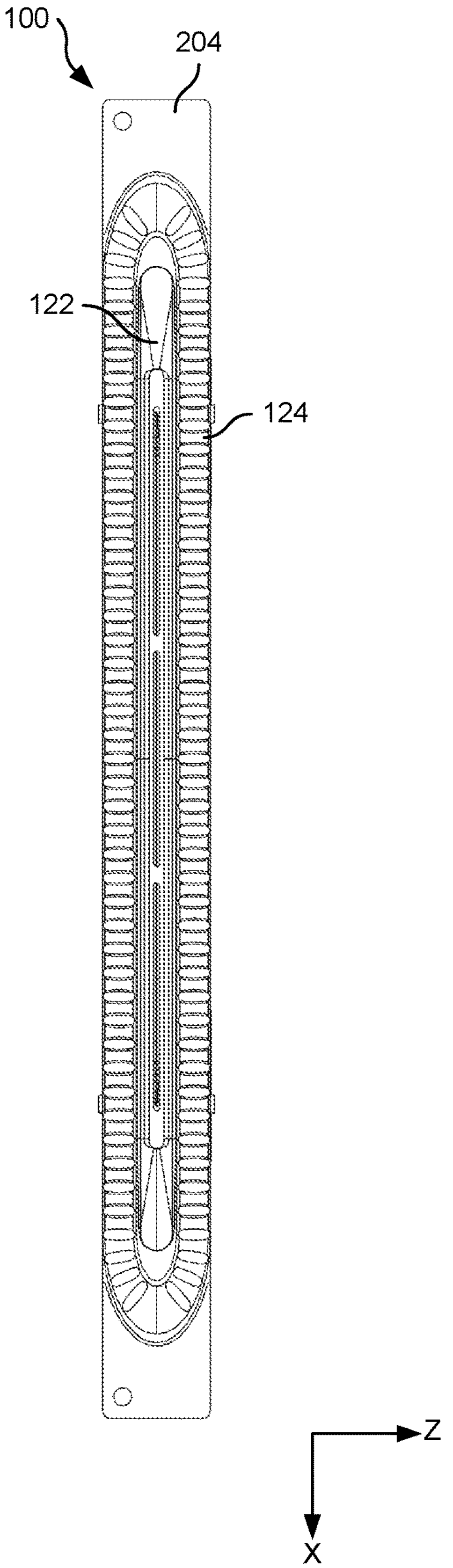
FIG. 6A illustrates a top view of the speaker of FIG. 1, according to examples of the present disclosure.
Figure 6B:
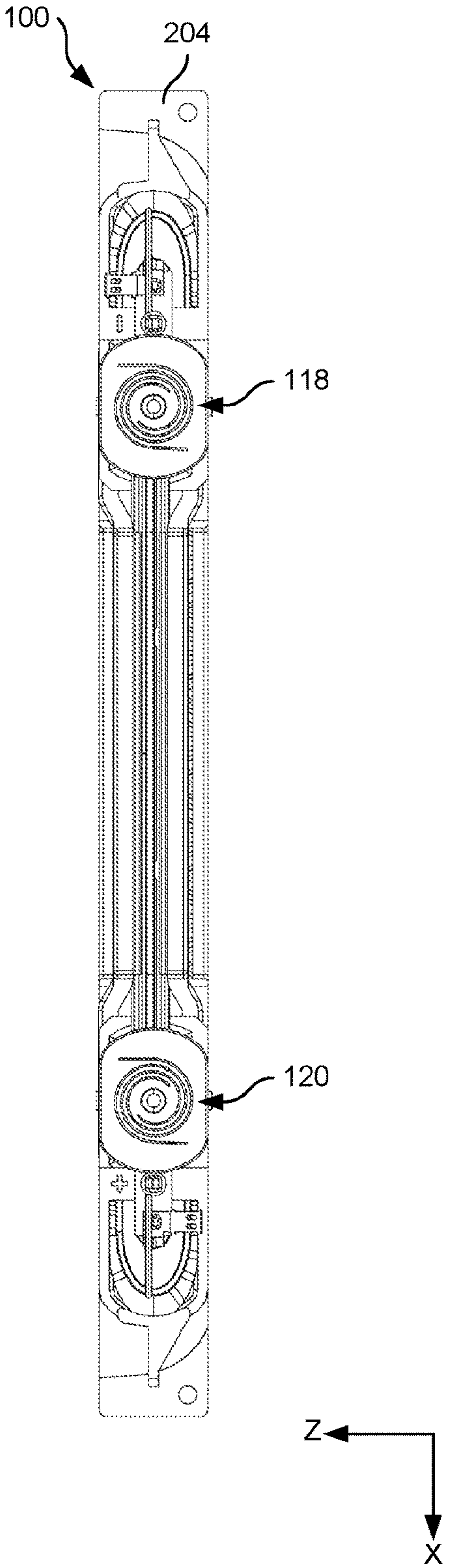
FIG. 6B illustrates a bottom view of the speaker of FIG. 1, according to examples of the present disclosure.

FIGS. 6A and 6B illustrate top and bottom views of the audio transducer 100, according to examples of the present disclosure. The cone 122 and the surround 124 are disposed at a top of the audio transducer 100, for example, and are oriented to output sound within an environment. The surround 124 is disposed around the cone 122. In some instances, portions of the former 106 (e.g., tabs) may be disposed through the cone 122 (e.g., slots, slits, etc. formed within the cone 122). The cone 122 and the surround 124 may be formed of a single piece of material (e.g., rubber) and couple to the frame 204. As shown, and given the aspect ratio of the actuator 102, the cone 122 and the surround 124 may include an elongated shape (e.g., ovular, rectangular, etc.). The first flexural spring 118 and the second flexural spring 120 are disposed at a bottom of the audio transducer 100. The first flexural spring 118 and the second flexural spring 120 may couple to the frame 204.

Figure 7A:
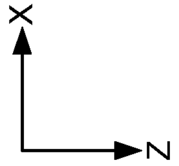
FIG. 7A illustrates a bottom view of the actuator of FIG. 1, according to examples of the present disclosure.
Figure 7A:
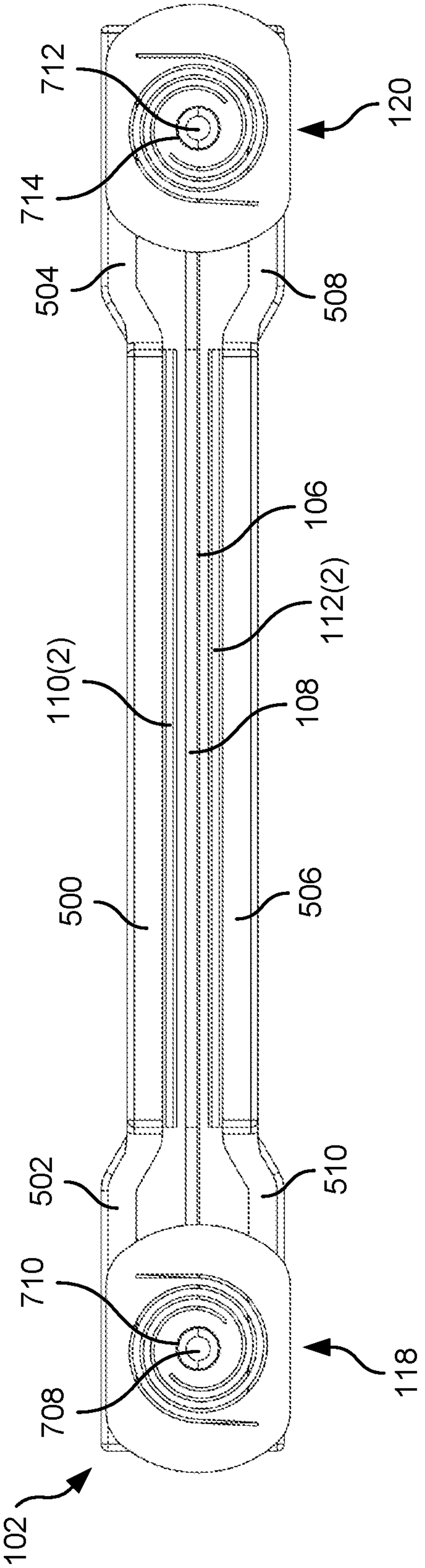
Figure 7B:
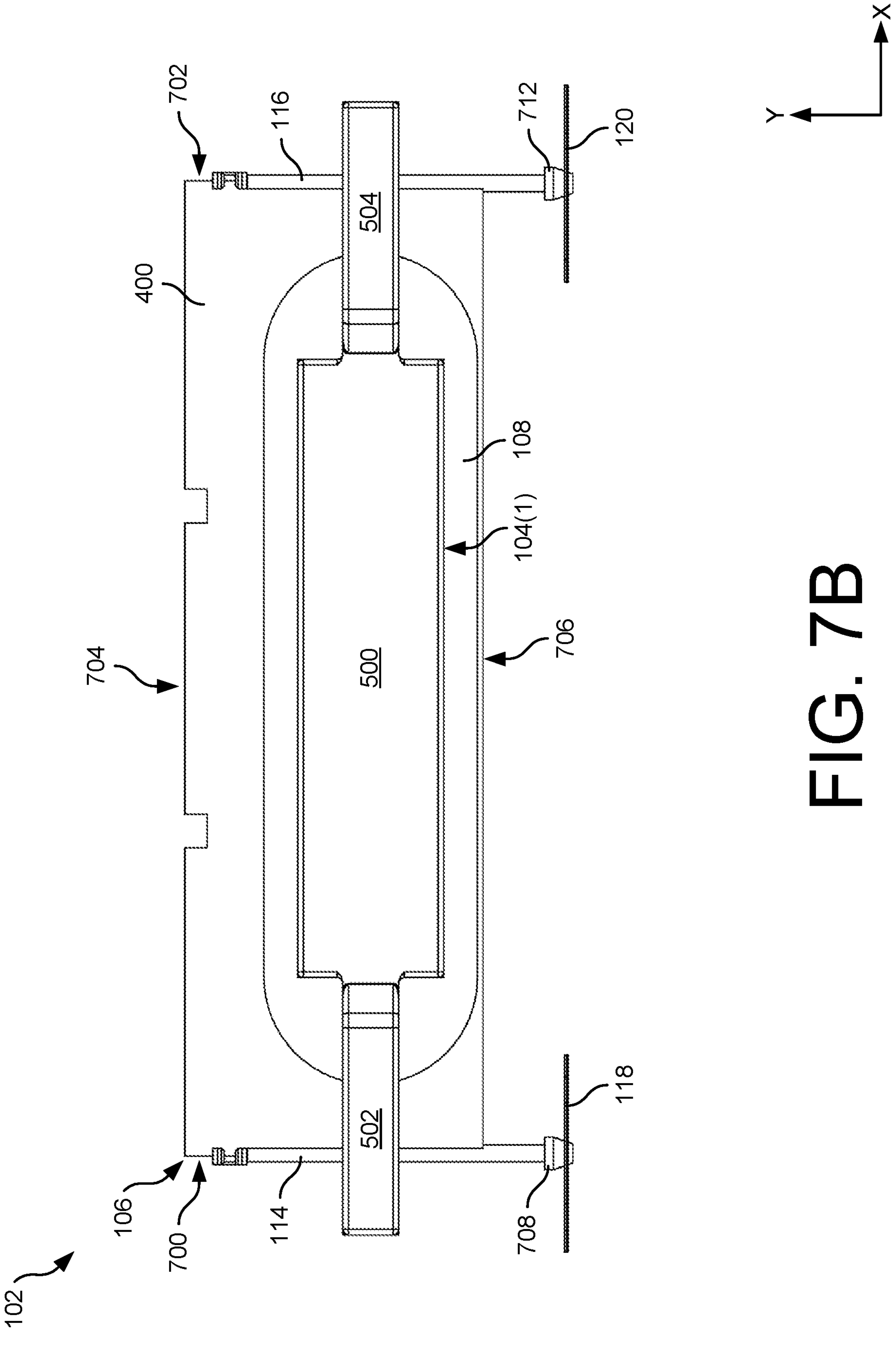
FIG. 7B illustrates a first side view of the actuator of FIG. 1, according to examples of the present disclosure.
Figure 7C:
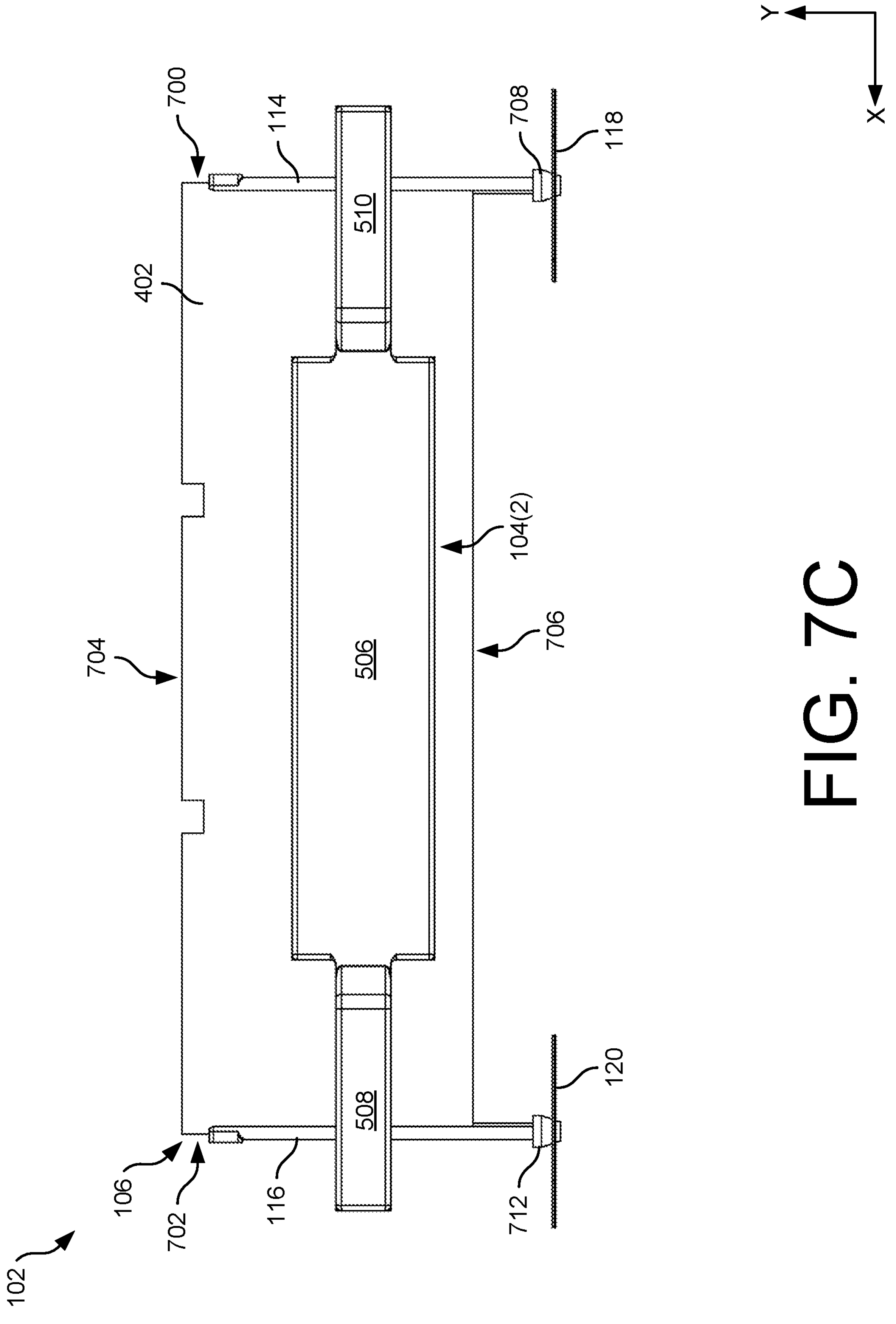
FIG. 7C illustrates a second side view of the actuator of FIG. 1, according to examples of the present disclosure.

FIGS. 7A-7C illustrate various details of the actuator 102, showing the actuator 102 uncoupled from the frame 204, according to examples of the present disclosure. As introduced above, the first magnetic assembly 104(1) includes the plate 500, from which the first arm 502 and the second arm 504 extend, as well as the first magnetic element 110(1) and the second magnetic element 110(2) disposed on the plate 500. The first magnetic assembly 104(1) may be disposed adjacent to (e.g., face, oriented towards, etc.) the first side 400 of the former 106. The voice-coil 108, which may represent a flat coil (e.g., racetrack coil) may be disposed on the first side 400 of the former 106. As such, the first magnetic element 110(1) and the second magnetic element 110(2) may be disposed adjacent to the voice-coil 108.

The second magnetic assembly 104(2) includes the plate 506, from which the first arm 508 and the second arm 510 extend, as well as the first magnetic element 112(1) and the second magnetic element 112(2) disposed on the plate 506. The second magnetic assembly 104(2) may be disposed adjacent to (e.g., face, oriented towards, etc.) the second side 402 of the former 106. In instances in which the former 106 is omitted, the first magnetic assembly 104(1) may be disposed adjacent to a first side of the voice-coil 108, and the second magnetic assembly 104(2) may be disposed adjacent to a second side of the voice-coil 108.

The first post 114 couples to the former 106 at a first end 700 of the former 106 and the second post 116 couples to the former 106 at a second end 702 of the former 106, spaced apart from the first end 700 (e.g., in the X-direction). The voice-coil 108 may be located centrally between the first end 700 and the second end 702. As will be discussed herein, the first post 114 may include a groove into which a portion of the first end 700 is disposed and/or coupled. The second post 116 may include a groove into which a portion of the second end 702 is disposed and/or coupled. The coupling of the first post 114 and the second post 116 to the former 106 may provide support to the former 106, for example, to keep the former 106 flat (e.g., in the X-Y plane). In instances in which the former 106 is omitted, the voice-coil 108 may couple at a first end to the first post 114 and the voice-coil 108 may couple at a second end to the second post 116, respectively.

The former 106 also includes a top 704 and a bottom 706 spaced apart from the top 704 (e.g., in the Y-direction). The top 704 may be at least partially disposed through the cone 122. As shown, the former 106 may couple to the first post 114 and the second post 116, at a location between the top 704 and the bottom 706. In some instances, the voice-coil 108 may be disposed closer to the bottom 706 than the top 704. The first post 114 may include a foot 708, made of the same or a different material as the post, and attached to first flexural spring 118 via a fastening means such as screw, press fit, adhesive, or welding, for example, that is disposed within an opening 710 of the first flexural spring 118. The second post 116 may include a foot 712, made of the same or a different material as the post, and attached to the first flexural spring 118 via a fastening means such as screw, press fit, adhesive, or welding, that is disposed within an opening 714 of the second flexural spring 120.

Figure 8:
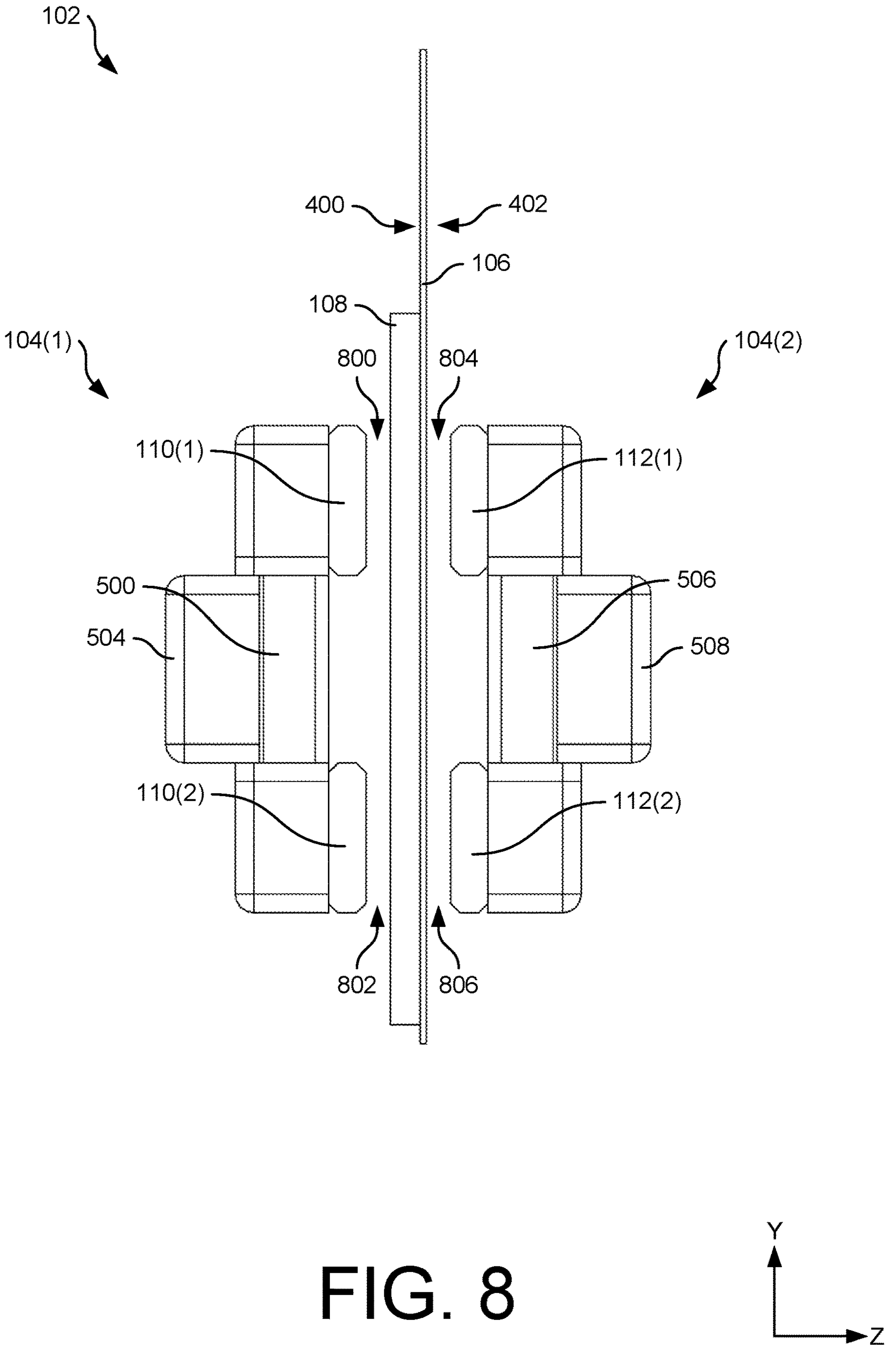
FIG. 8 illustrates an end view of the actuator of FIG. 1, showing example magnetic assemblies with example magnetic elements that act as the actuator of the audio transducer, according to examples of the present disclosure.

FIG. 8 illustrates a side view of the actuator 102, according to examples of the present disclosure. The actuator 102 includes the first magnetic assembly 104(1) disposed on the first side 400 of the former 106 (or the voice-coil 108), and the second magnetic assembly 104(2) disposed on the second side 402 of the former 106 (or the voice-coil 108). The first magnetic assembly 104(1) includes the plate 500, the first arm 502, and the second arm 504. The first magnetic element 110(1) and the second magnetic element 110(2) are disposed on the plate 500. As shown, the first magnetic element 110(1) and the second magnetic element 110(2) may be spaced apart from one another (e.g., in the Y-direction).

The first magnetic element 110(1) may be spaced apart from the former 106 or the voice-coil 108 by a first distance 800 (e.g., in the Z-direction). The second magnetic element 110(2) may be spaced apart from the former 106 or the voice-coil 108 by a second distance 802 (e.g., in the Z-direction). The first distance 800 and the second distance 802 may represent an air gap disposed between the magnetic elements 110 of the first magnetic assembly 104(1) and the voice-coil 108.

The second magnetic assembly 104(2) includes the plate 506, the first arm 508, and the second arm 510. The first magnetic element 112(1) and the second magnetic element 112(2) are disposed on the plate 506. As shown, the first magnetic element 112(1) and the second magnetic element 112(2) may be spaced apart from one another (e.g., in the Y-direction). The first magnetic element 112(1) may be spaced apart from the second side 402 of the former 106 by a first distance 804 (e.g., in the Z-direction). The first magnetic element 110(1) may be attractive to the first magnetic element 112(1), and the second magnetic element 110(2) may be attractive to the second magnetic element 112(2).

The second magnetic element 112(2) may be spaced apart from the second side 402 of the former 106 or the voice-coil 108 by a second distance 806 (e.g., in the Z-direction).

The first distance 804 and the second distance 806 may represent an air gap disposed between the magnetic elements 112 of the second magnetic assembly 104(2) and the former 106, or the voice-coil 108. In some instances, the first distance 800, the second distance 802, the first distance 804, and the second distance 806 may be the same. Alternatively, in some instances, the first distance 800, the second distance 802, the first distance 804, and the second distance 806 may be different. The first distance 800, the second distance 802, the first distance 804, and the second distance 806 permit the former 106 and/or the voice-coil 108 to translate, move, vibrate, etc. The coupling of the first magnetic assembly 104(1) and the second magnetic assembly 104(2) to the frame 204 maintains the first air gap and the second air gap, thereby preventing the attractive force between first magnetic assembly 104(1) and the second magnetic assembly 104(2) contacting the former 106 and/or the voice-coil 108.

Although the actuator 102 is described as having the magnetic assembly 104 disposed on either side of the voice-coil 108, in some instances, a magnetic assembly 104 may be disposed between one or more voice-coils 108. In such instances, the magnetic assembly 104 may be considered a moving component of the actuator 102.

Figure 9:
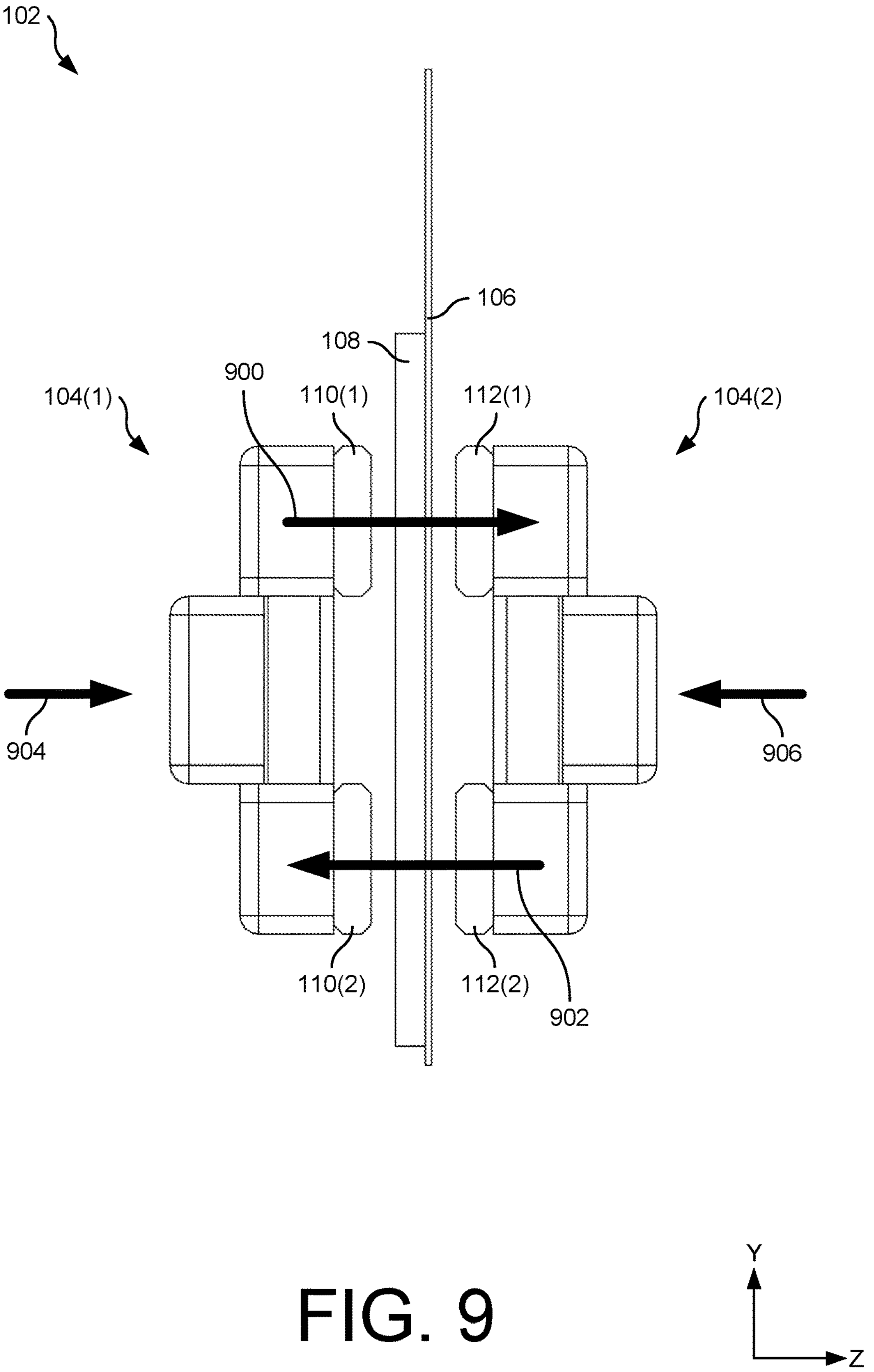
FIG. 9 illustrates an end view of the actuator of FIG. 1, showing a magnetic flux flowing between the magnetic elements of FIG. 8, according to examples of the present disclosure.

FIG. 9 illustrates an example operation of the actuator 102, according to examples of the present disclosure. The first magnetic element 110(1) is attractive to the first magnetic element 112(1). This attraction creates a first magnetic flux 900 that flows from the first magnetic element 110(1) to the first magnetic element 112(1), through the former 106 and/or the voice-coil 108. Additionally, the second magnetic element 112(2) is attractive to the second magnetic element 110(2). This attraction creates a second magnetic flux 902 that flows from the second magnetic element 112(2) to the second magnetic element 110(2), through the former 106 and/or the voice-coil 108. The first magnetic flux 900 and the second magnetic flux 902 create a magnetic field. As current is supplied to the voice-coil 108 (e.g., via the first terminal 126 and the second terminal 128), the former 106 and/or the voice-coil 108 vibrate. In turn, this vibration creates sound that is emitted from the audio transducer 100.

Given the attraction between the first magnetic assembly 104(1) and the second magnetic assembly 104(2), forces are generated. The frame 204 resists, or overcomes, these forces to hold the first magnetic assembly 104(1) and the second magnetic assembly 104(2) in place. For example, a first force 904 and a second force 906 may be generated via an attraction between the magnetic elements 110 of the first magnetic assembly 104(1) and magnetic elements 112 of the second magnetic assembly 104(2). The frame 204 holds the first magnetic assembly 104(1) and the second magnetic assembly 104(2) in place despite the attraction forces between the magnetic elements 110 and the magnetic elements 112.

Figure 10:
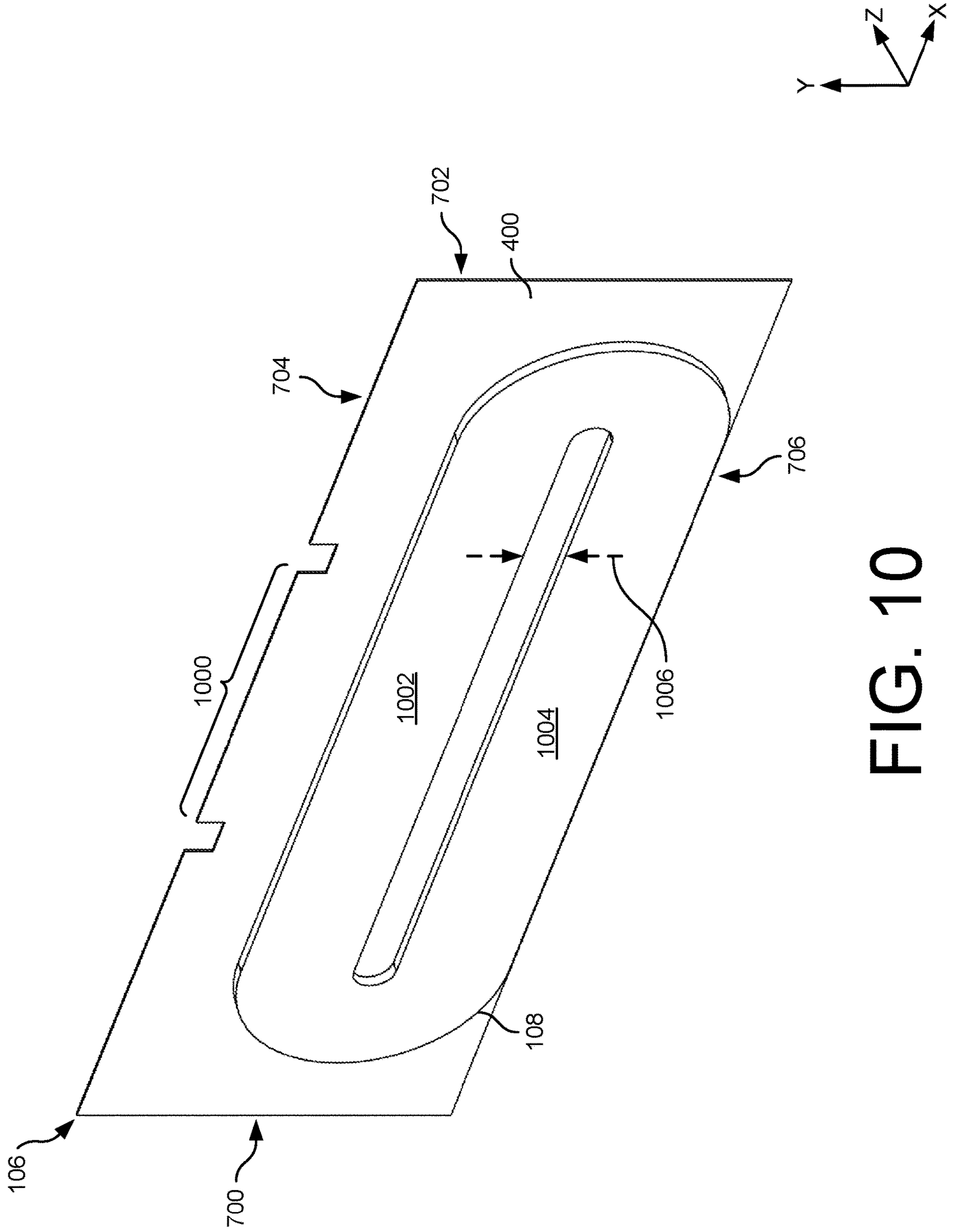
FIG. 10 illustrates a former and a voice-coil of the actuator of FIG. 1, according to examples of the present disclosure.

FIG. 10 illustrates the former 106 and the voice-coil 108, according to examples of the present disclosure. As introduced above, the former 106 includes the first side 400, the second side 402, the first end 700, the second end 702, the top 704, and the bottom 706. The voice-coil 108 is disposed on the first side 400, and may be located closer to the bottom 706 than the top 704. The former 106 may represent a thinned sheet of aluminum.

The former 106 may include tabs 1000 disposed along the top 704. For example, the former 106 may include three of the tabs 1000 disposed along the top 704. In some instances, the tabs 1000 may be disposed within slots of the cone 122 to provide support to the former 106. For example, the positioning of the tabs 1000 within the cone 122 may engage the former 106 and the cone 122 along the top 704 to support the former 106.

The voice-coil 108, as shown, represents a flat coil or a racetrack coil. The voice-coil 108 may be made from copper wire, for example, and may be coupled (e.g., adhered) to the first side 400 of the former 106. Given the thinned nature of the former 106, the coupling to the first post 114 and the second post 116 may provide the former 106 (and the voice-coil 108) with structure. The voice-coil 108 may be coupled to the first terminal 126 and the second terminal 128 via wires. The voice-coil 108 may include a first track 1002 (e.g., section, trace, etc.) and a second track 1004 (e.g., section, trace, etc.), a gap 1006 may be disposed between the first track 1002 and the second track 1004. Although described as including separate tracks, as shown, the first track 1002 and the second track 1004 may be continuous. The voice coil construction is made using any of the known techniques of coil winding used in loudspeaker or motor design, which may include single or multifilar winding methods, single or multiple coil layers, conductors made from various electrically conductive materials, conductors of various cross sections such as round wire, flattened or rectangular wire, and the turns within the coil arranged in any desired pattern including those known in the art such as edgewound or flatwound. The specific size and shape of the voice coil is designed in conjunction with the magnetic elements to achieve the desired actuator characteristics, for example to obtain a given Lorentz force vs excursion profile, achieve a particular moving mass target, or enable a given power-handling target, among others deemed important in a given design. The first magnetic element 110(1) may be disposed adjacent to the first track 1002, spaced apart by the first distance 800, and the second magnetic element 110(2) may be disposed adjacent to the second track 1004, spaced apart by the second distance 802. In some instances, the first track 1002 and the second track 1004 have a dimension (e.g., in the Y-direction) that is greater than a dimension (e.g., in the Y-direction) of the magnetic elements 110.

In some instances, the former 106 may be made from anodized aluminum and/or the voice-coil 108 may be made from copper-clad aluminum. Other possible materials which could be used for the windings including copper, aluminum, silver, or various other electrically alloys as known in the art. Manufacturing the former 106 and the voice-coil 108 from a similar material as that used for the windings may reduce a coefficient of thermal expansion between the former 106 and the voice-coil 108, thereby reducing warping problems during manufacturing, or in use during high power events where the voice-coil 108 will tend to heat up and differential stresses will be greatest.

Figure 11A:
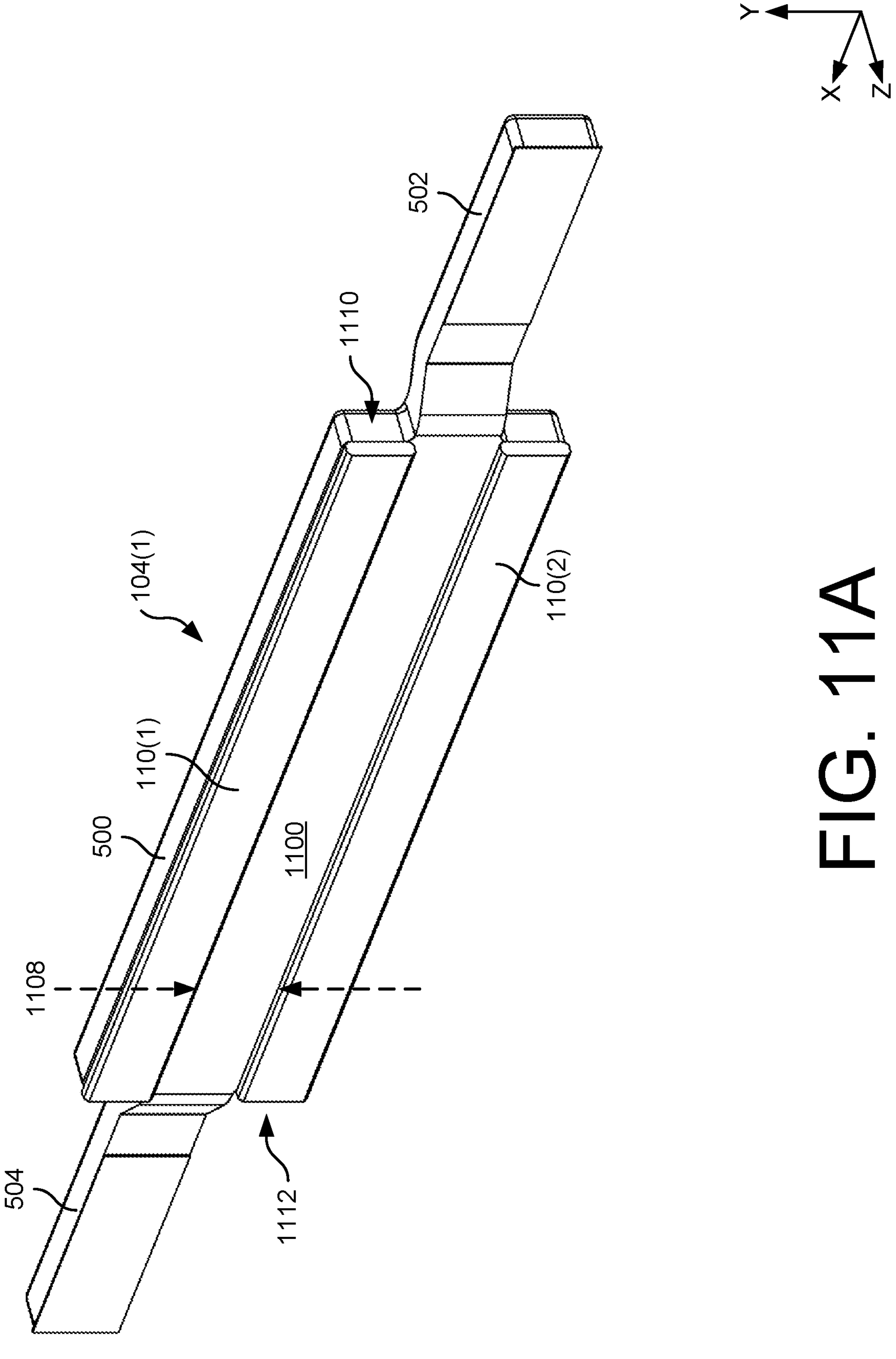
FIG. 11A illustrates an isometric view of a partial magnetic assembly of FIG. 8, according to examples of the present disclosure.
Figure 11B:
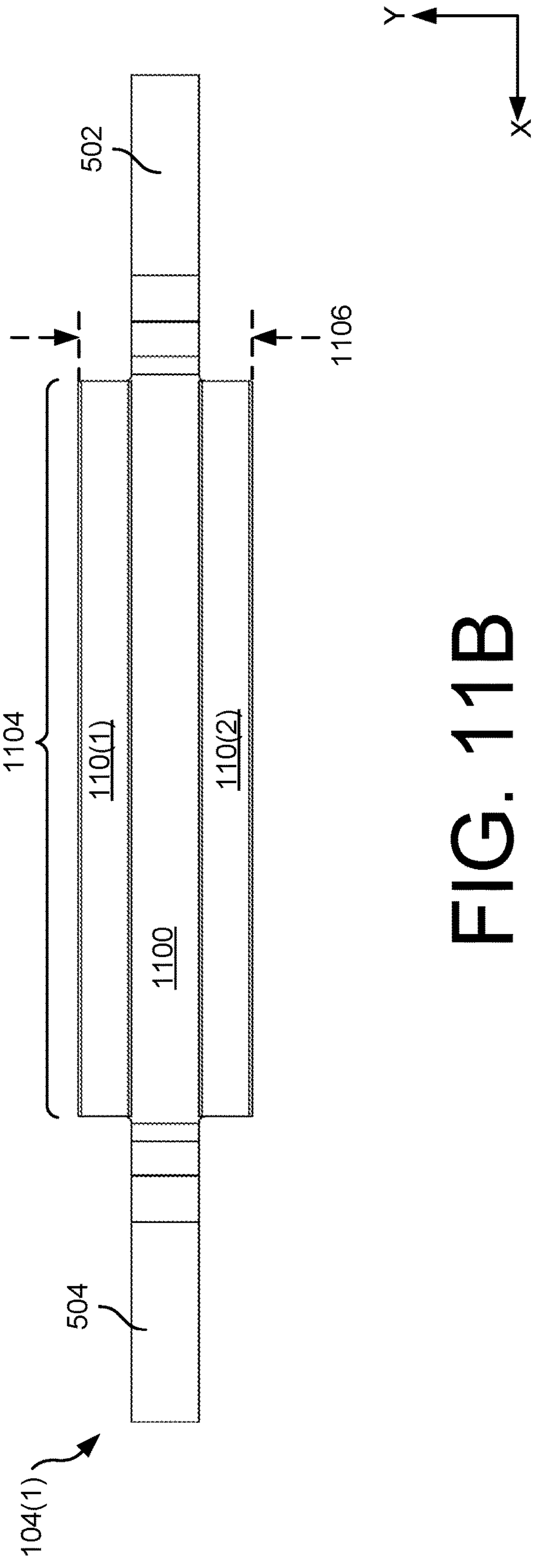
FIG. 11B illustrates a side view of the partial magnetic assembly of FIG. 8, according to examples of the present disclosure.
Figure 11C:
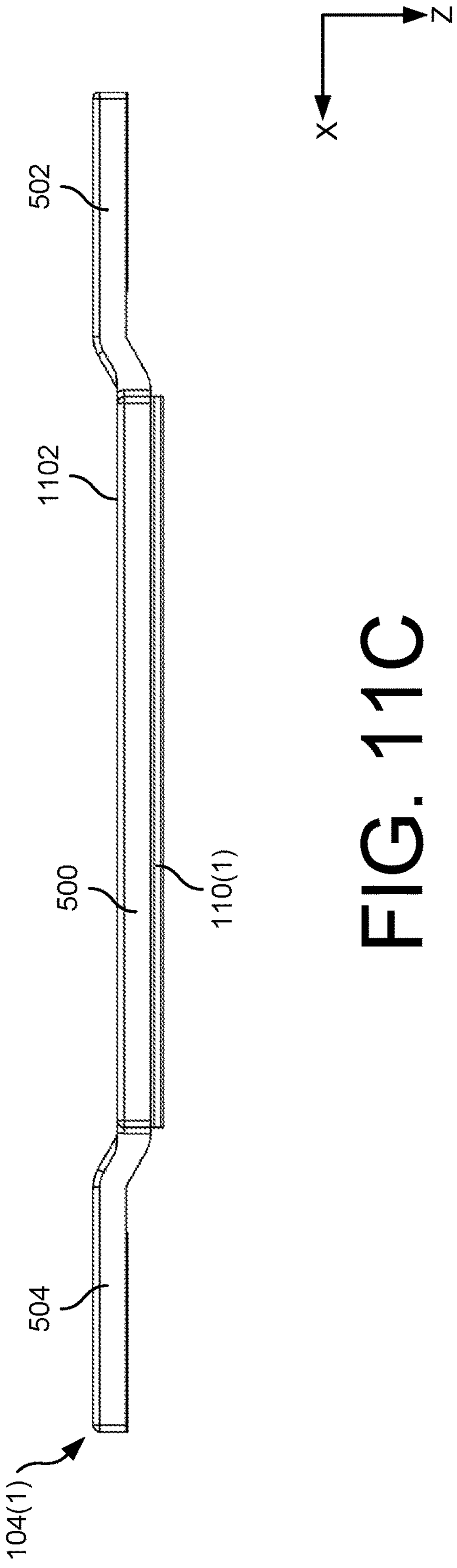
FIG. 11C illustrates a top view of the magnetic assembly of FIG. 8, according to examples of the present disclosure.
Figure 12A:
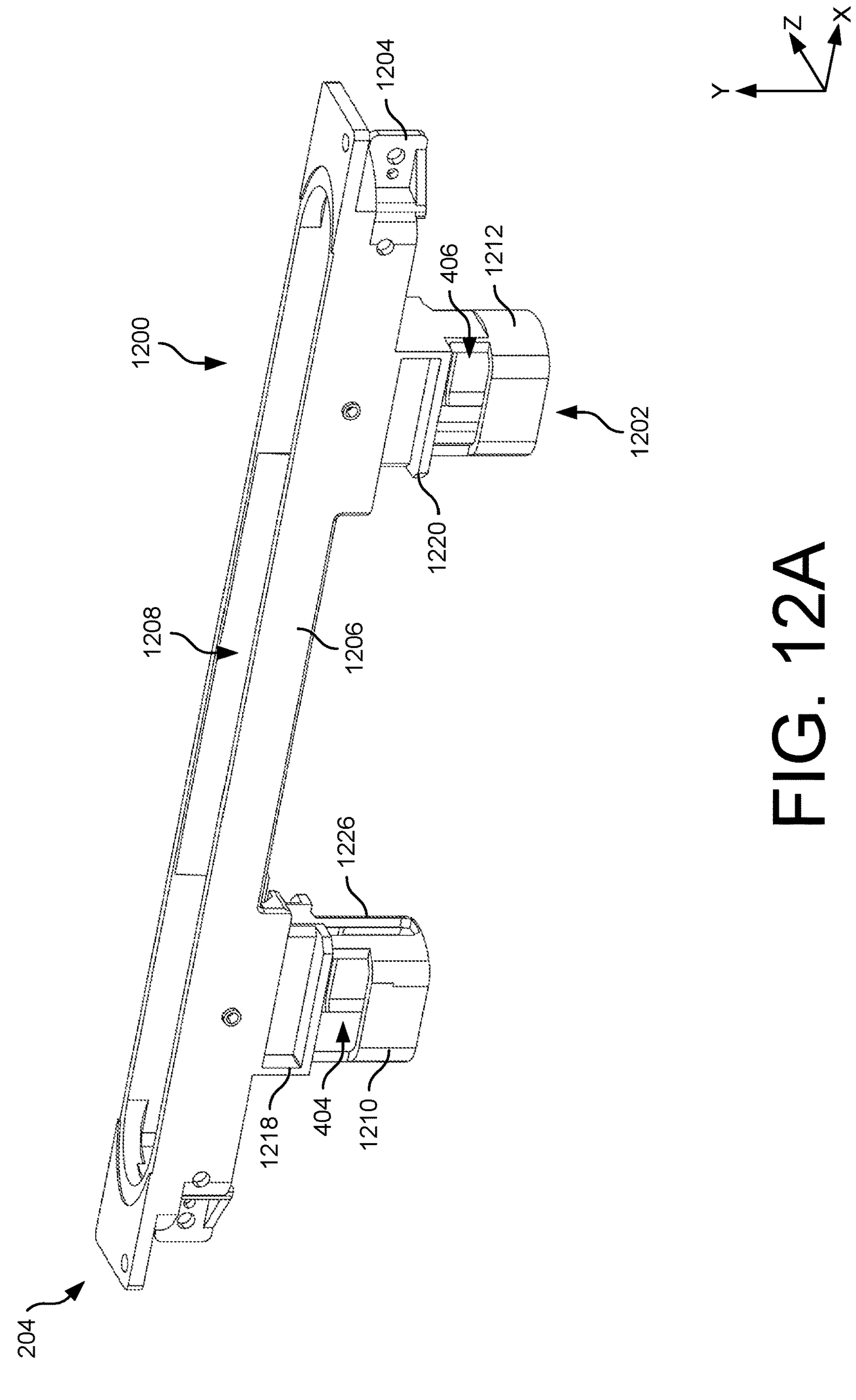
FIG. 12A illustrates a first isometric view of an example frame of the actuator of FIG. 1, according to examples of the present disclosure.
Figure 12B:
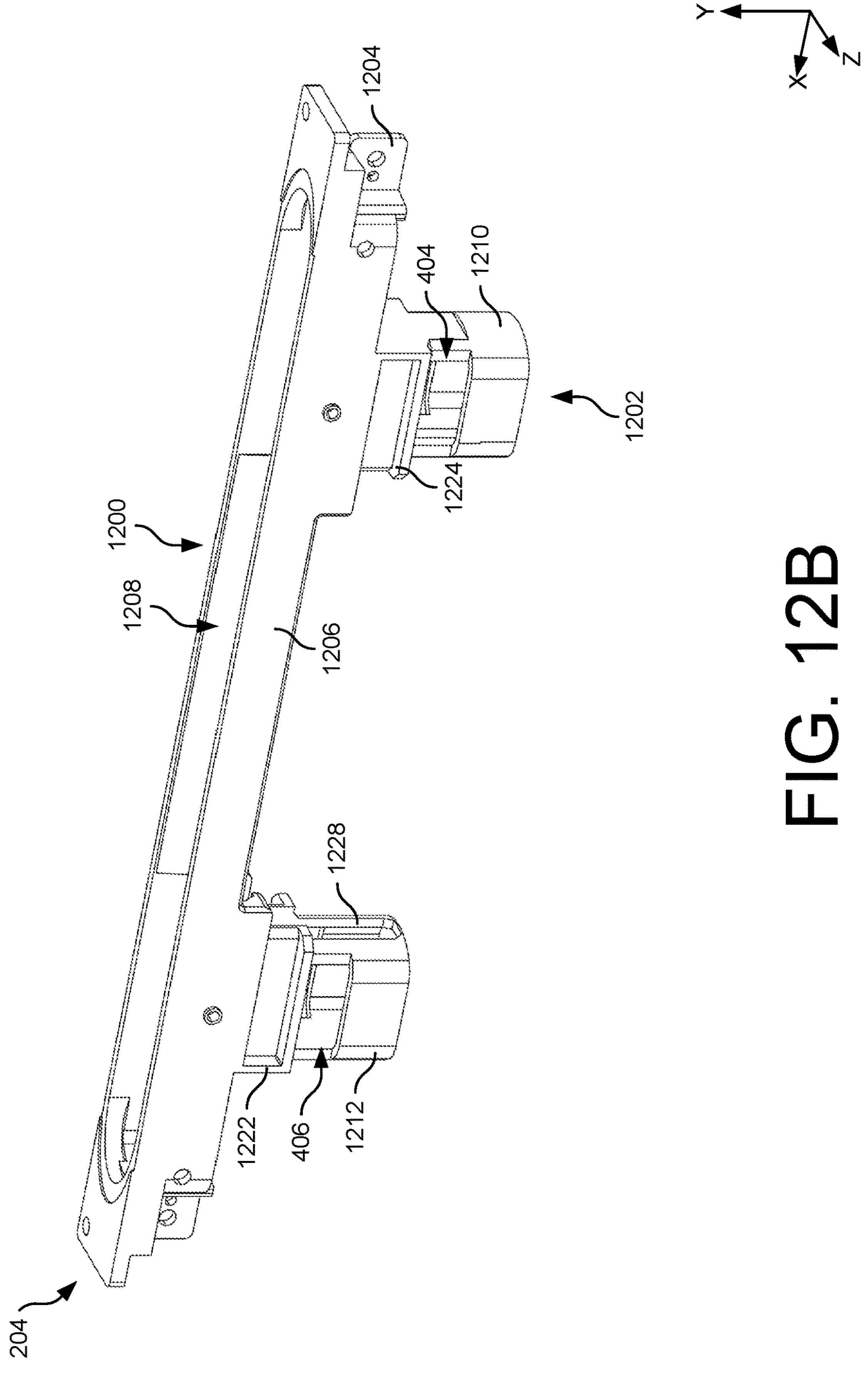
FIG. 12B illustrates a second isometric view of the frame of FIG. 12A, according to examples of the present disclosure.
Figure 12C:
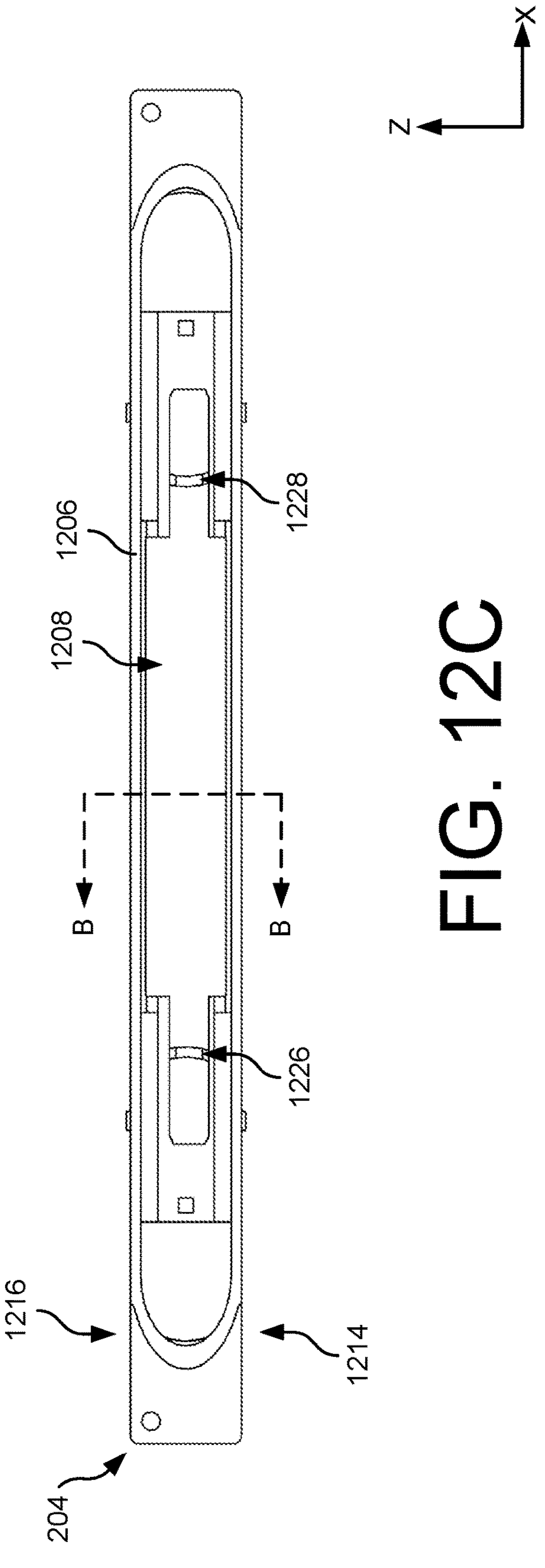
FIG. 12C illustrates a top view of the frame of FIG. 12A, according to examples of the present disclosure.
Figure 12D:
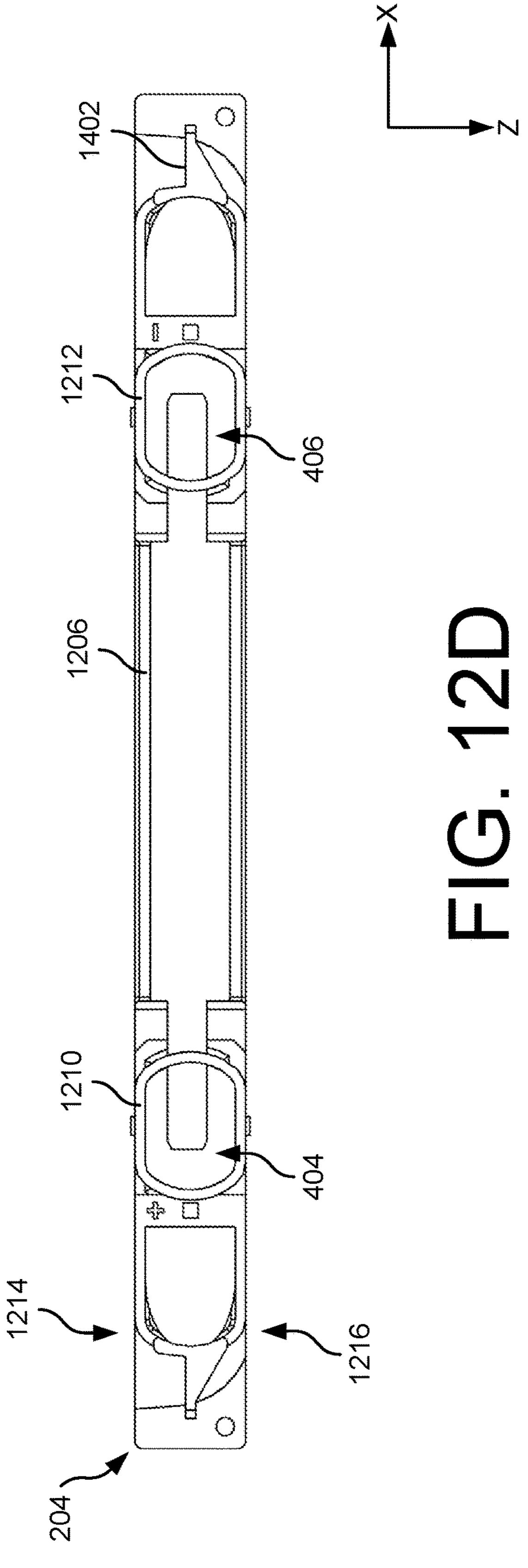
FIG. 12D illustrates a bottom view of the frame of FIG. 12A, according to examples of the present disclosure.
Figure 12E:
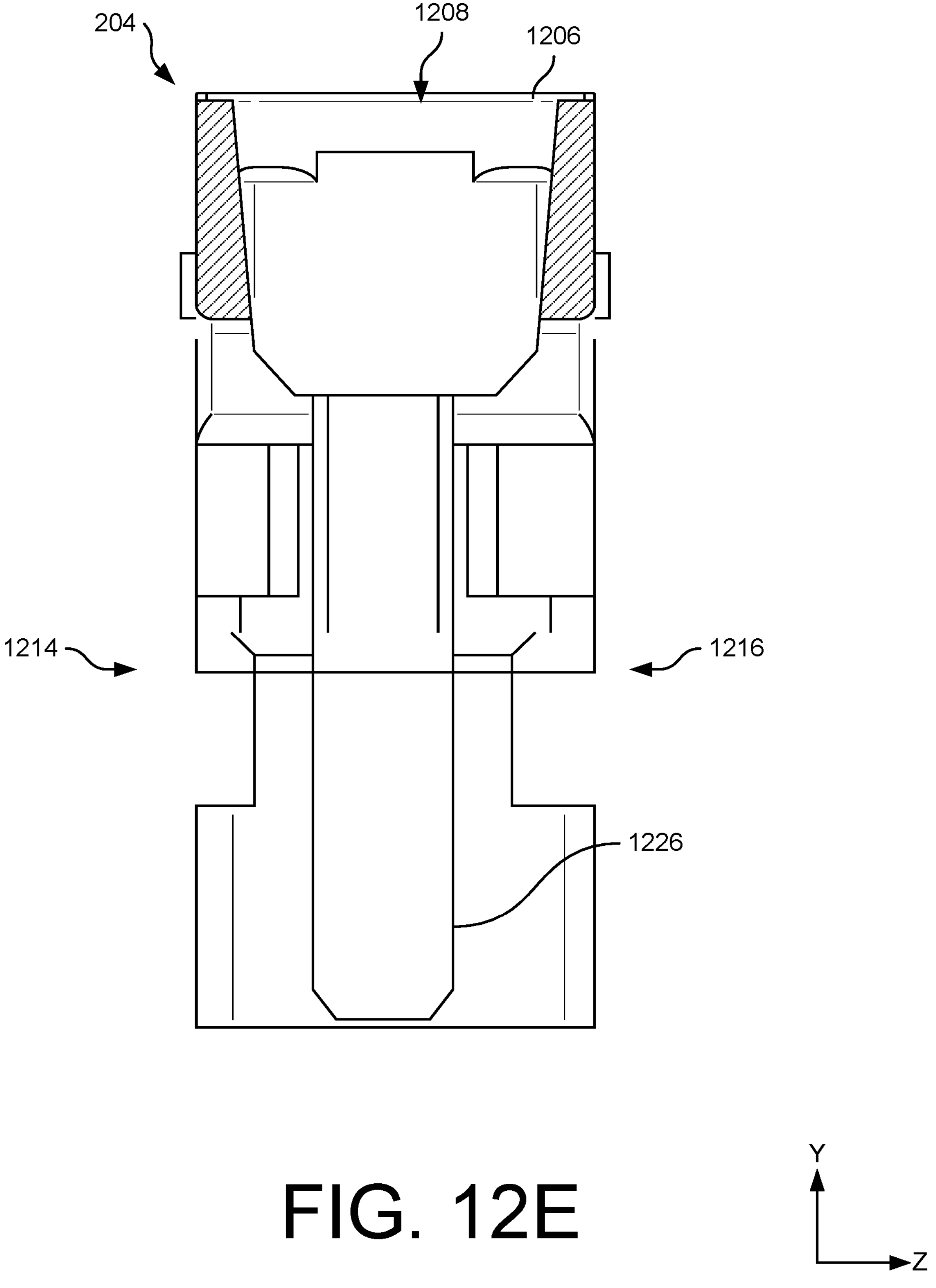
FIG. 12E illustrates a cross-sectional view of the frame of FIG. 12A, taken along line B-B of FIG. 12C, according to examples of the present disclosure.

FIGS. 11A-11C illustrate details of the first magnetic assembly 104(1), according to examples of the present disclosure. Although the discussion herein relates to the first magnetic assembly 104(1), the second magnetic assembly 104(2) may include similar components. As such, the discussion of the first magnetic assembly 104(1) may apply to the second magnetic assembly 104(2).

As introduced above, the first magnetic assembly 104(1) includes the plate 500, which may represent a flat piece of material (e.g., sheet, base, etc.). The plate 500 may be manufactured from steel. The plate 500 also includes a first surface 1100, and a second surface 1102. The first magnetic element 110(1) and the second magnetic element 110(2) may be disposed on the first surface 1100. In an embodiment, the first magnetic element 110(1) and/or the second magnetic element 110(2) may be fastened, adhered, welded, etc. onto the first surface 1100.

The plate 500 may have a length 1104 (e.g., in the X-direction) and a height 1106 (e.g., in the Y-direction). The first magnetic element 110(1) and the second magnetic element 110(2) may have a length, which in some instances, may be less than, equal to, or greater than the length 1104. The first magnetic element 110(1) and the second magnetic element 110(2) may have a thickness (e.g., in the Z-direction). The first magnetic element 110(1) and the second magnetic element 110(2) may also be spaced apart by a gap distance 1108 (e.g., in the Y-direction).

When the first magnetic assembly 104(1) couples to the frame 204, the first magnetic element 110(1) may be disposed adjacent to the first track 1002, and the second magnetic element 110(2) may be disposed adjacent to the second track 1004. The gap distance 1108 may be disposed adjacent to the gap 1006.

The first arm 502 may extend from a first end 1110 of the plate 500, and the second arm 504 may extend form a second end 1112 of the plate 500. As shown, the first arm 502 may curve in a direction from the first surface 1100 to the second surface 1102 (e.g., in the Z-direction). The second arm 504, similarly, may curve in a direction from the first surface 1100 to the second surface 1102 (e.g., in the Z-direction). This curvature may accommodate disposing the magnetic elements 110 away from the former 106 and/or the voice-coil 108 by the first distance 800 and the second distance 802, respectively. In other words, with the curvature of the first arm 502 and the second arm 504, when the first magnetic assembly 104(1) couples to the frame 204, the first magnetic element 110(1) and the second magnetic element 110(2) may be spaced apart from the voice-coil 108 by the first distance 800 and the second distance 802, respectively.

In some instances, the magnetic elements 110 may represent permanent magnets, ferrous elements, electromagnets, temporary magnets, etc. The magnetic elements 110 may include similar or different magnetic strengths as compared to one another. In some instances, the plate 500 may define pockets (e.g., recesses, indents, etc.) within which the magnetic elements are disposed. Although a certain configuration of the first magnetic assembly 104(1) is shown, other variations are envisioned. For example, rather than including two of the magnetic elements 110, the first magnetic assembly 104(1) may include more than two of the magnetic elements 110 (e.g., four). The magnetic elements 110 may also be shaped different than shown, and/or sized differently than shown. In such instances, the plate 500, the first arm 502, and/or the second arm 504 may be differently sized and/or shaped. Additionally, although the first magnetic element 110(1) and the second magnetic element 110(2) are shown being continuous pieces of material, the first magnetic element 110(1) and the second magnetic element 110(2) may be made up of separate pieces.

FIGS. 12A-12E illustrate various views of the frame 204, according to examples of the present disclosure. The frame 204 may include a top 1200 and a bottom 1202, spaced apart from the top 1200 (e.g., in the Y-direction). The top 1200 may couple to the housing 200, for example, and may be disposed external to the cavity 300. The bottom 1202 may be disposed within the cavity 300. In some instances, the frame 204 includes one or more flanges 1204 having passages through which fasteners are disposed for coupling the frame 204 to the housing 200.

The frame 204 may include a base 1206 defining a cavity 1208 (e.g., receptacle, etc.) in which the actuator 102 is at least partially disposed. For example, portions of the former 106, the voice-coil 108, the first magnetic assembly 104(1), the second magnetic assembly 104(2), etc. may be at least partially disposed within the cavity 1208. A first column 1210 and a second column 1212 may extend from the base 1206. The first column 1210 and the second column 1212 may at least partially define the first compartment 404 and the second compartment 406 in which the first post 114 and the second post 116 are at least partially disposed, respectively.

The frame 204 also includes a first side 1214 and a second side 1216 spaced apart from the first side 1214 (e.g., in the Z-direction). The first magnetic assembly 104(1) may be disposed along the first side 1214, while the second magnetic assembly 104(2) may be disposed along the second side 1216. The frame 204 may define a first receptacle 1218 for receiving the first arm 502, or in which the first arm 502 is at least partially disposed. The frame 204 may also define a second receptacle 1220 for receiving the second arm 504, or in which the second arm 504 is at least partially disposed. Likewise, the frame 204 defines a third receptacle 1222 for receiving the first arm 508, or in which the first arm 508 is at least partially disposed, and a fourth receptacle 1224 for receiving the second arm 510, or in which the second arm 510 is at least partially disposed.

In some instances, the first receptacle 1218 and the fourth receptacle 1224 may be disposed along the first column 1210 and/or the second receptacle 1220 and the third receptacle 1222 may be disposed along the second column 1212. Once coupled to the frame 204, the plate 500 may be disposed between the first column 1210 and the second column 1212, and the plate 506 may be disposed between the first column 1210 and the second column 1212. The first column 1210 may also define a channel 1226 for accommodating the first end 700 of the former 106, or the voice-coil 108. The second column 1212 may define a channel 1228 for accommodating the second end 702 of the former 106, or the voice-coil 108.

The frame 204 may be manufactured from suitable materials, such as plastic, composites, metals, etc. The frame 204 may be manufactured using injection molding. Alternatively, in some instances, the frame 204 may be manufactured from aluminum to act as a heat sink. Moreover, as discussed above, the frame 204 may be strong enough to resist the first force 904 and the second force 906 generate via the magnetic elements 110 and the magnetic elements 112.

Figure 13A:
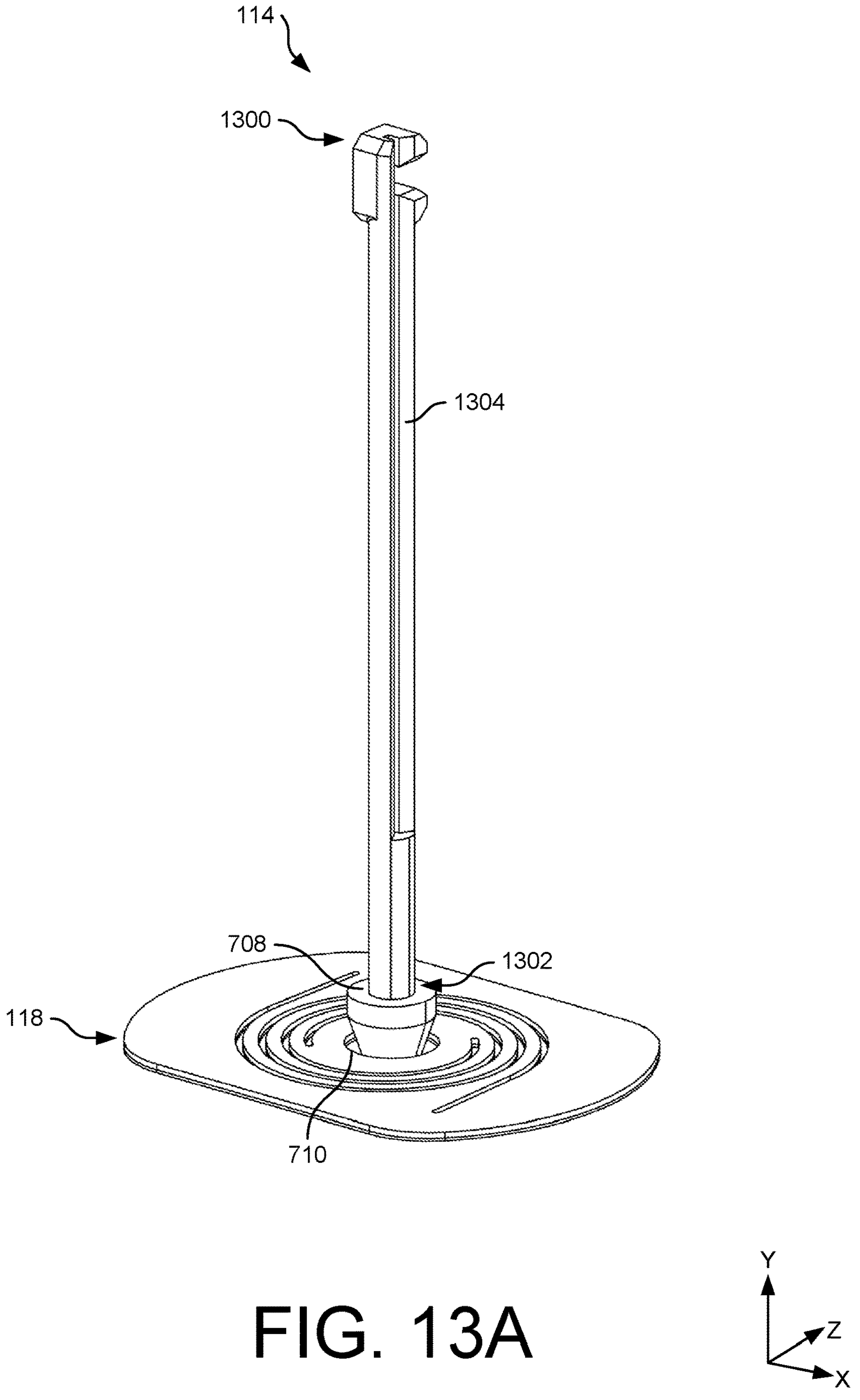
FIG. 13A illustrates an isometric view of a first post and a first flexural spring of the actuator of FIG. 1, according to examples of the present disclosure.
Figure 13B:
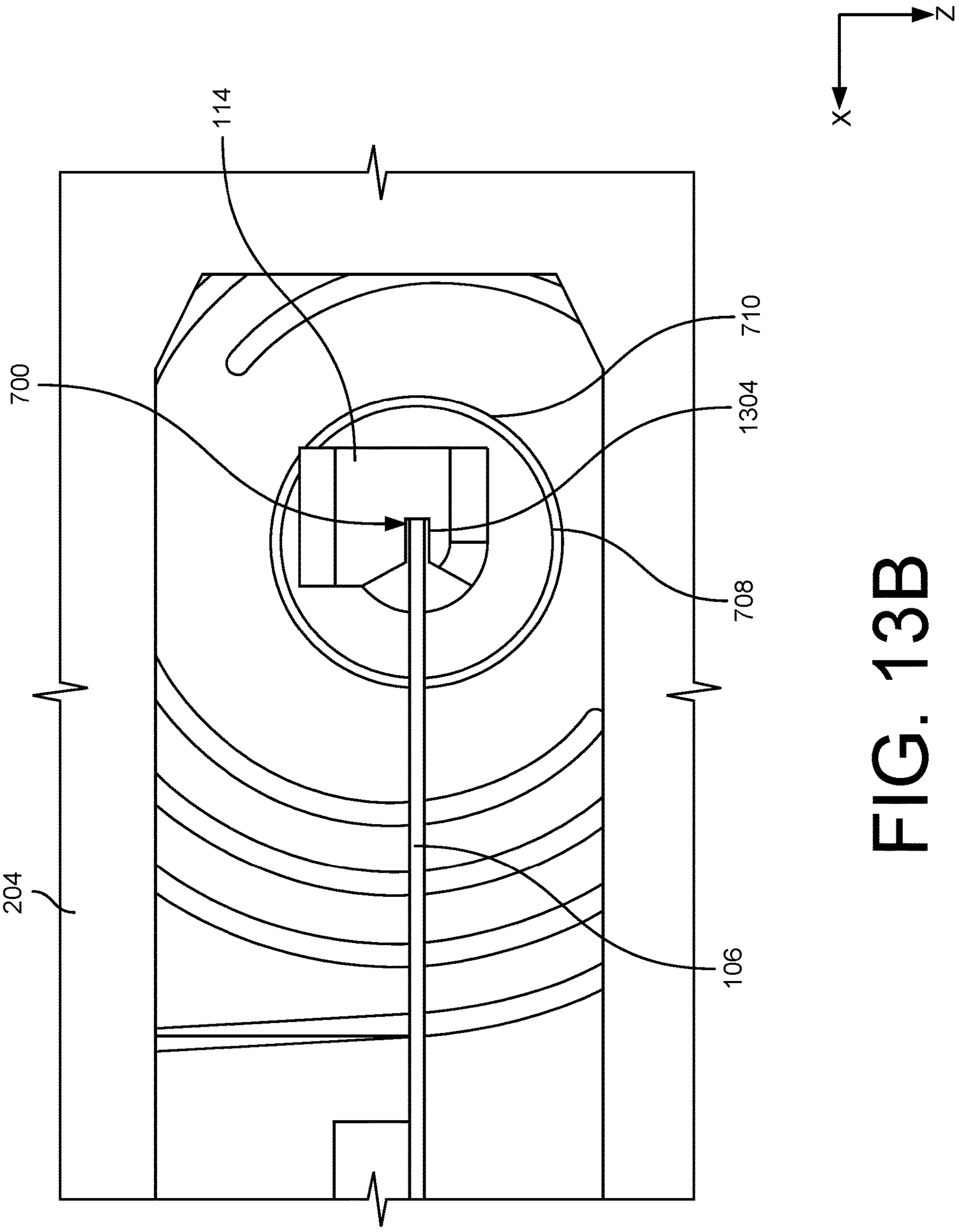
FIG. 13B illustrates a coupling of the first post and the former of FIG. 10, according to examples of the present disclosure.

FIGS. 13A and 13B illustrate the first post 114 and the first flexural spring 118, according to examples of the present disclosure. The first post 114 includes a first end 1300 and a second end 1302 spaced apart from the first end 1300 (e.g., in the Y-direction). A length of the first post 114 extends between the first end 1300 and the second end 1302. In some instances, the second end 1302 may be coupled to the first flexural spring 118 via fasteners, adhesives, press fits, etc. (for clarity, the fastening method is not shown in the figures).

The first post 114 includes a groove 1304 (e.g., trough, channel, cutout, etc.) for receiving the first end 700 of the former 106, or an end of the voice-coil 108. In some instances, the first end 700 of the former 106 (or the voice-coil 108) may be coupled to the first post 114, at a location within the groove 1304. The positioning of the first end 700 in the groove 1304 may provide structural support to the former 106 and/or the voice-coil 108. The first post 114 may also include the foot 708 disposed at the second end 1302. In some instances, the first end 1300 may be disposed within the cavity 1208, and the second end 1302 may be disposed in the first compartment 404.

The first flexural spring 118 includes the opening 710 into which the foot 708 is at least partially disposed. Details of the first flexural spring 118 are discussed herein, however, the first flexural spring 118 provides a suspension function to the former 106 and/or the voice-coil 108. For example, the foot 708 may engage with the first flexural spring 118, and the first flexural spring 118 may provide the first post 114 with various degrees of movement, translation, rotation, etc. As shown, the first flexural spring 118 may represent a coil, spiral, etc. layout.

Figure 14A:
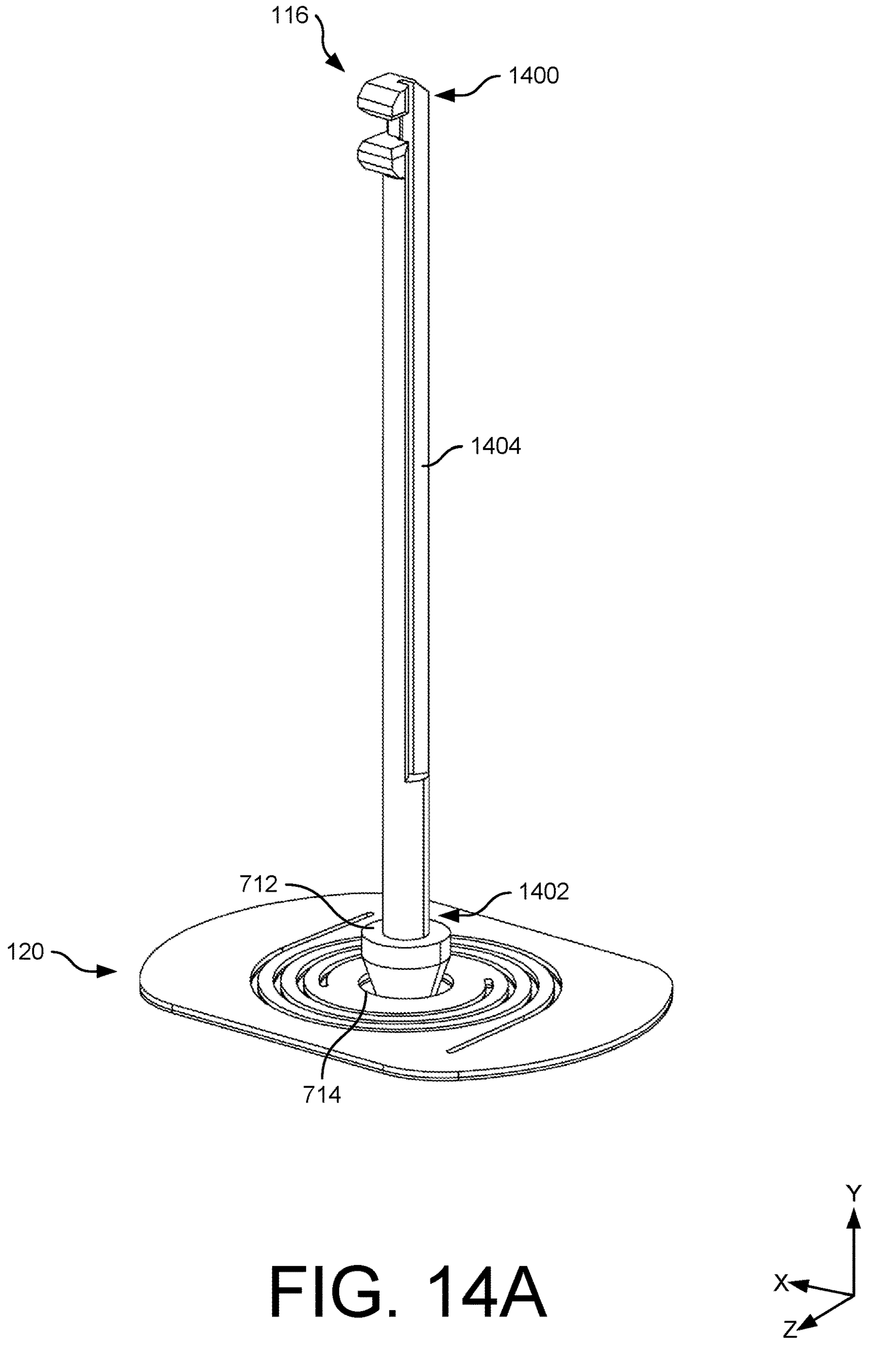
FIG. 14A illustrates an isometric view of a second post and a second flexural spring of the actuator of FIG. 1, according to examples of the present disclosure.
Figure 14B:
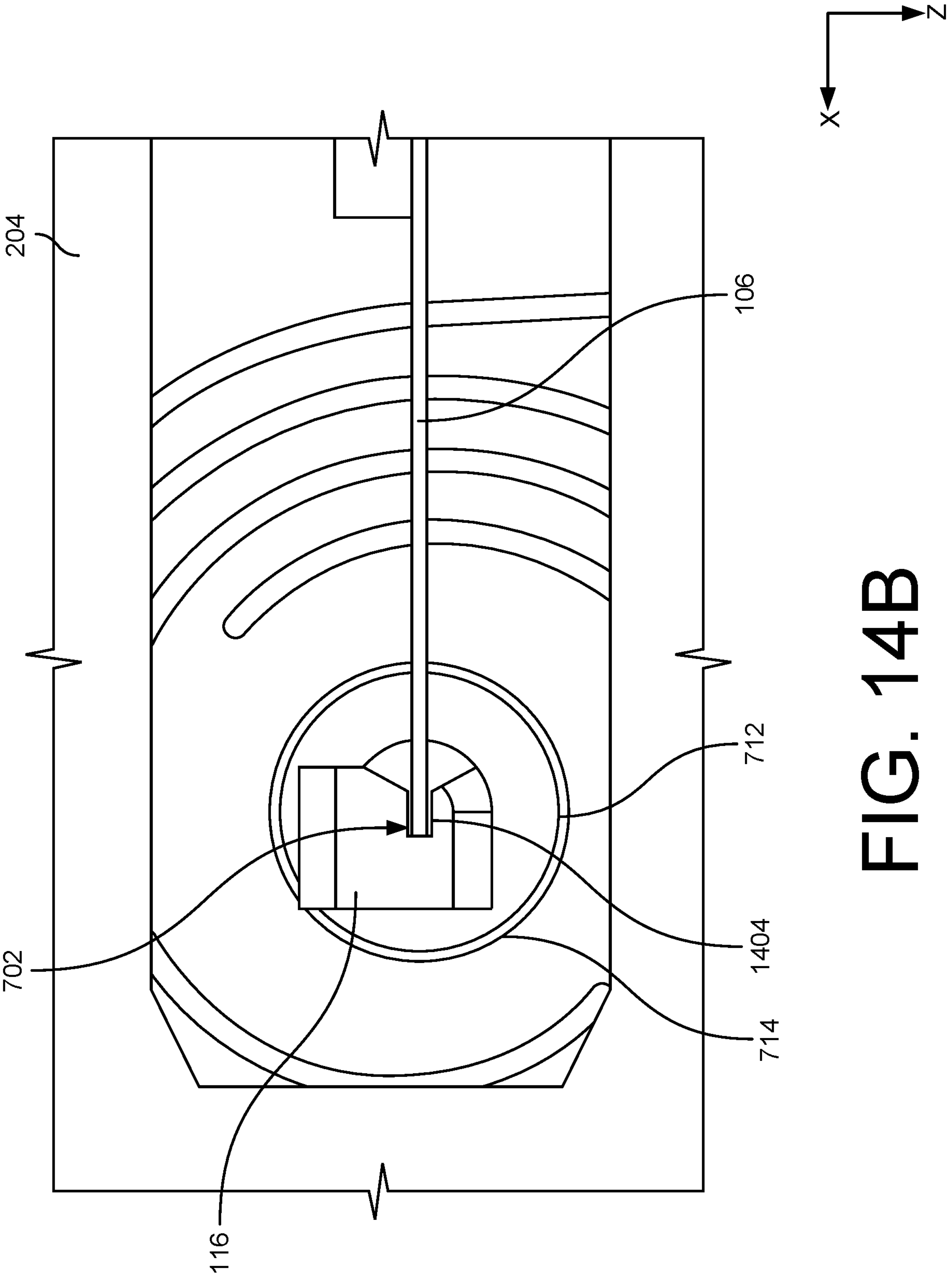
FIG. 14B illustrates a coupling of the second post to the former of FIG. 10, according to examples of the present disclosure.

FIGS. 14A and 14B illustrate the second post 116 and the second flexural spring 120, according to examples of the present disclosure. The second post 116 includes a first end 1400 and a second end 1402 spaced apart from the first end 1400 (e.g., in the Y-direction). A length of the second post 116 extends between the first end 1400 and the second end 1402. In some instances, the second end 1402 may be coupled to the second flexural spring 120 via fasteners, adhesives, press fits, etc.

The second post 116 includes a groove 1404 (e.g., trough, channel, cutout, etc.) for receiving the second end 702 of the former 106, or an end of the voice-coil 108. In some instances, the second end 702 of the former 106 (or the voice-coil 108) may be coupled to the second post 116, at a location within the groove 1404. The positioning of the second end 702 in the groove 1404 may provide structural support to the former 106 and/or the voice-coil 108. The former 106 may also include the foot 712 disposed at the second end 1402. In some instances, the first end 1400 may be disposed within the cavity 1208, and the second end 1402 may be disposed in the second compartment 406.

The second flexural spring 120 includes the opening 714 into which the foot 712 is at least partially disposed. Details of the second flexural spring 120 are discussed herein, however, the second flexural spring 120 provides suspension to the former 106. For example, the foot 712 may engage with the second flexural spring 120, and the second flexural spring 120 may provide the second post 116 with various degrees of movement, translation, rotation, etc. as intended for that particular design. As shown, the second flexural spring 120 may represent a coil, spiral, etc. layout.

Figure 15A:
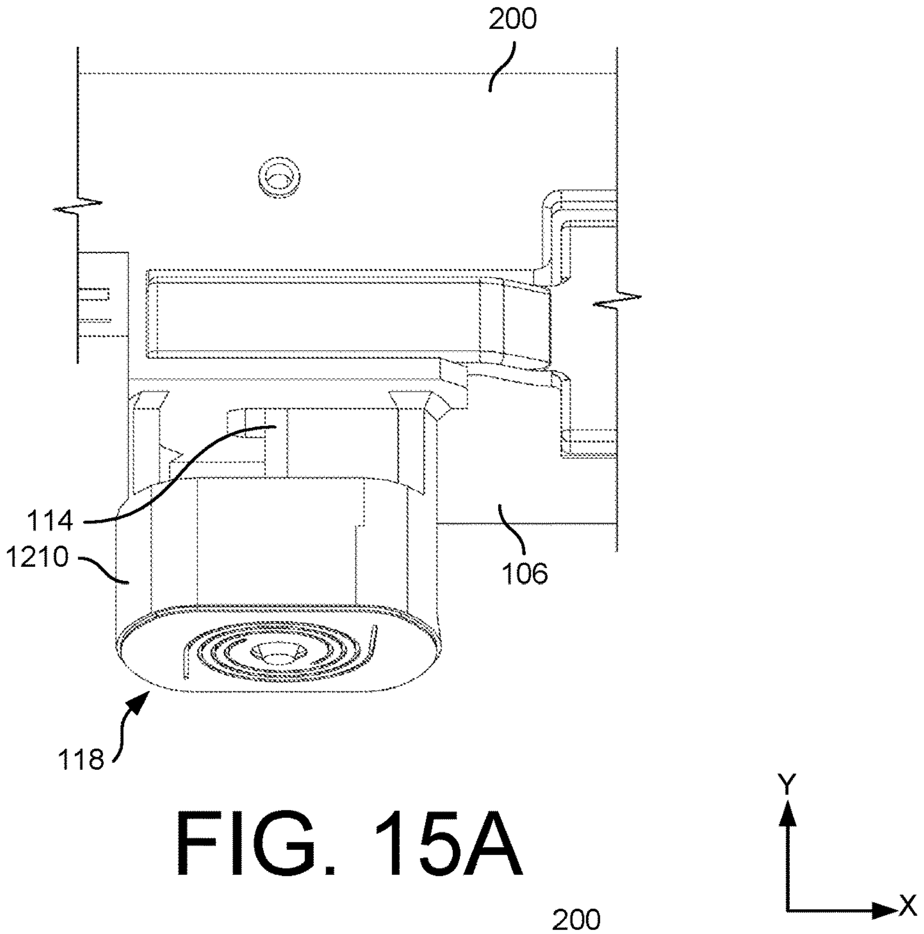
FIG. 15A illustrates the first flexural spring of FIG. 13A coupled to the frame of FIG. 12A, according to examples of the present disclosure.
Figure 15B:
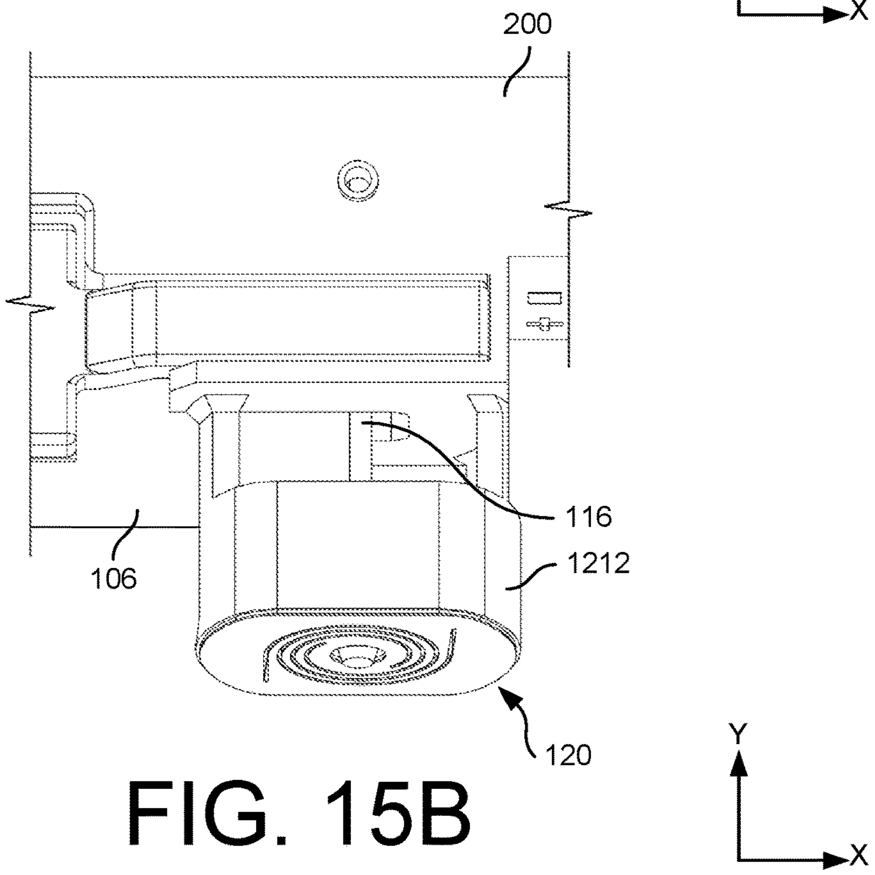
FIG. 15B illustrates the second flexural spring of FIG. 14A coupled to the frame of FIG. 12A, according to examples of the present disclosure.

FIGS. 15A and 15B illustrate the first flexural spring 118 and the second flexural spring 120, according to examples of the present disclosure. The first flexural spring 118 couples to an end of the first column 1210, while the second flexural spring 120 couples to an end of the second flexural spring 120. In some instances, the first flexural spring 118 and the second flexural spring 120 may couple to the first column 1210 and the second column 1212, respectively, via adhesives, snap-fits, etc. In some instances, the housing 200 may include flanges, shelves, etc. against which the first flexural spring 118 and the second flexural spring 120 are disposed. With the channel 1226 and the channel 1228, and the coupling of the former 106 and/or the voice-coil 108 to the first post 114 and the second post 116, the first flexural spring 118 and the second flexural spring 120 may provide suspension to the actuator 102.

Figure 16:
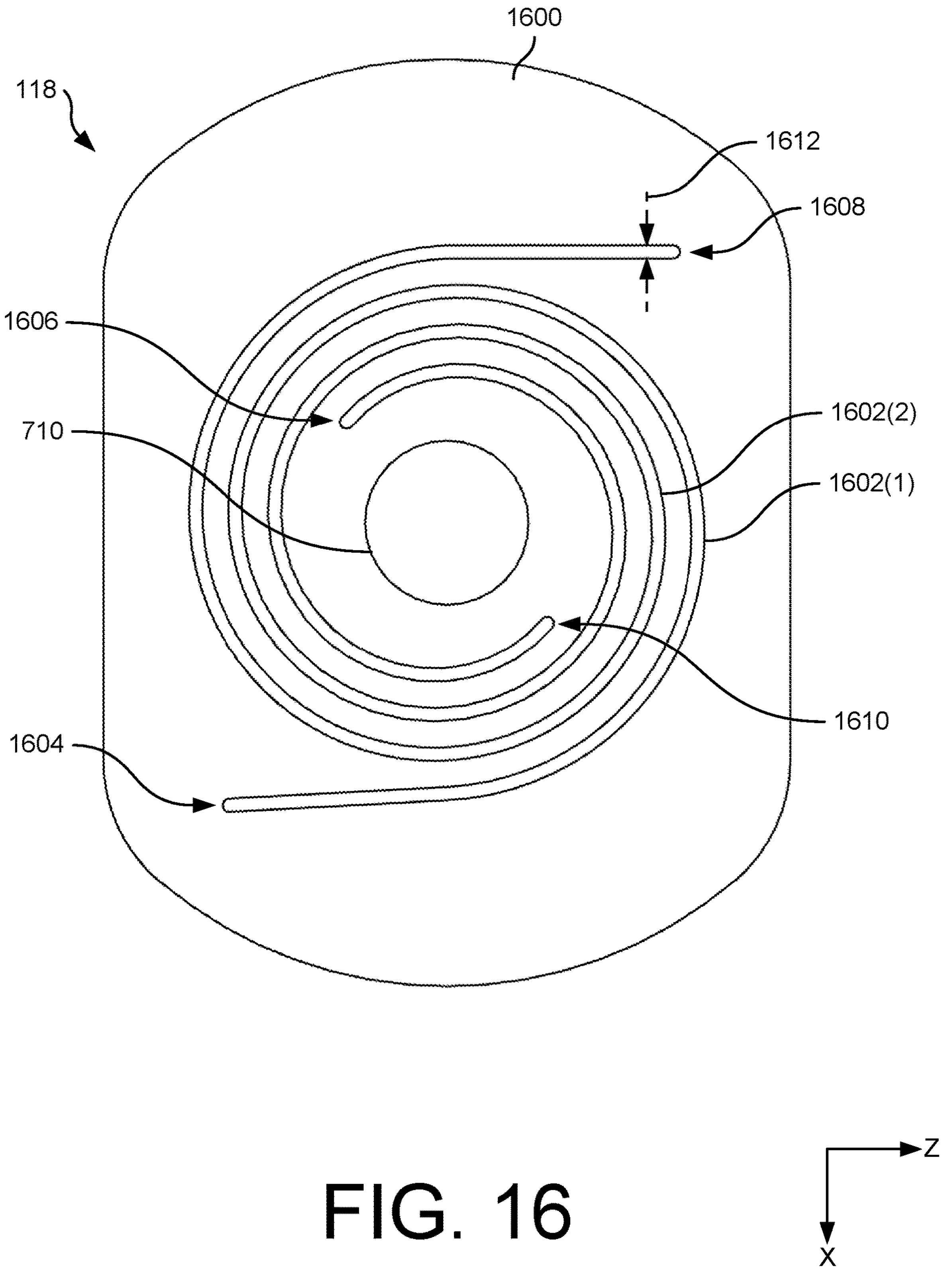
FIG. 16 illustrates details of the first flexural spring of FIG. 13A, according to examples of the present disclosure.

FIG. 16 illustrates the first flexural spring 118, according to examples of the present disclosure. Although the discussion herein relates to the first flexural spring 118, the second flexural spring 120 may include similar components. As such, the discussion of the first flexural spring 118 may apply to the second flexural spring 120.

The first flexural spring 118 may be formed within a sheet 1600 (e.g., plate, layer, etc.), such as a piece of metal, for example, beryllium copper, titanium alloy, spring steel, etc. using chemically etching, water jetting, stamping, laser cutting, etc. In other embodiments, the flexural spring may have 3D geometry and not be restricted to a planar design. In some instances, the first flexural spring 118 may include one or more cutout slots having a spiral shape. In some instances, the cutout slots may form coils. For example, a first coil 1602(1) and a second coil 1602(2) may be interwoven, interlaced, concentric, etc. For example, the first coil 1602(1) and/or the second coil 1602(2) may be at least partially disposed within one another (e.g., in the X-direction and/or Z-direction). The first coil 1602(1) may include a first end 1604 and a second end 1606, and the second coil 1602(2) may include a first end 1608 and a second end 1610. The first end 1608 may form an arm of the first flexural spring 118 and the first end 1608 may form an arm of the first flexural spring 118. The second end 1606 and the second end 1610 may be disposed adjacent to the opening 710. Peripheral shape of flexure may match with the base shape of the first column 1210 and the second column 1212 in order to ensure there is sufficient surface area to bond/attach the flexural spring. The peripheral shape of the flexural spring may be racetrack, rectangular, circular, trapezoidal, etc.

In some instances, each of the first coil 1602(1) and/or the second coil 1602(2) may have 1.25 turns. However, other turns are envisioned, and the some instances, the first coil 1602(1) and/or the second coil 1602(2) may have a different amount of turns. The first coil 1602(1) and/or the second coil 1602(2) may also include a 0.5 millimeter slot width 1612. In general, narrower slot widths lead to higher performance designs, for example higher radial stiffness, but the minimum width of the slot is set by the manufacturing process and tolerances required. In some instances, the slot width 1612 of the first coil 1602(1) and/or the second coil 1602(2) may be different or similar, and the slot with may be non-uniform along its path. Additionally, although the first coil 1602(1) and the second coil 1602(2) are described and shown as being circular, other shapes are envisioned.

In some instances, the use of the first flexural spring 118 may improve the excursion capability of the cone 122 and/or lead to a high aspect ratio of the audio transducer 100. The first flexural spring 118 may have a high fatigue life, may induce little noise to the audio transducer 100, may have high dampening, and may have a high radial stiffness and a low axial stiffness. Although the first flexural spring 118 is shown including a certain number of coils and/or arms, the first flexural spring 118 may include more than, or less than, the number of coils and/or arms as shown. Additionally, the coils 1602 and/or arms may be different sized (e.g., smaller or larger diameter) and/or shaped than shown (e.g., ovular).

Figure 17A:
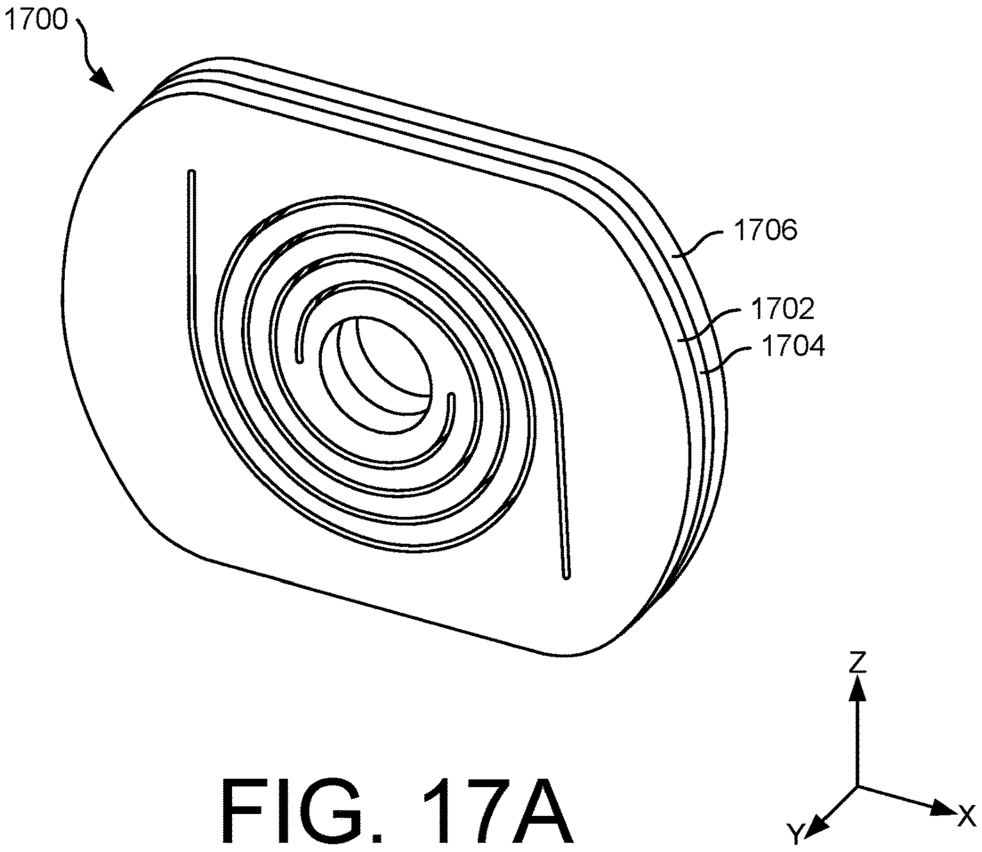
FIG. 17A illustrates a first example of a flexural spring, according to examples of the present disclosure.
Figure 17B:
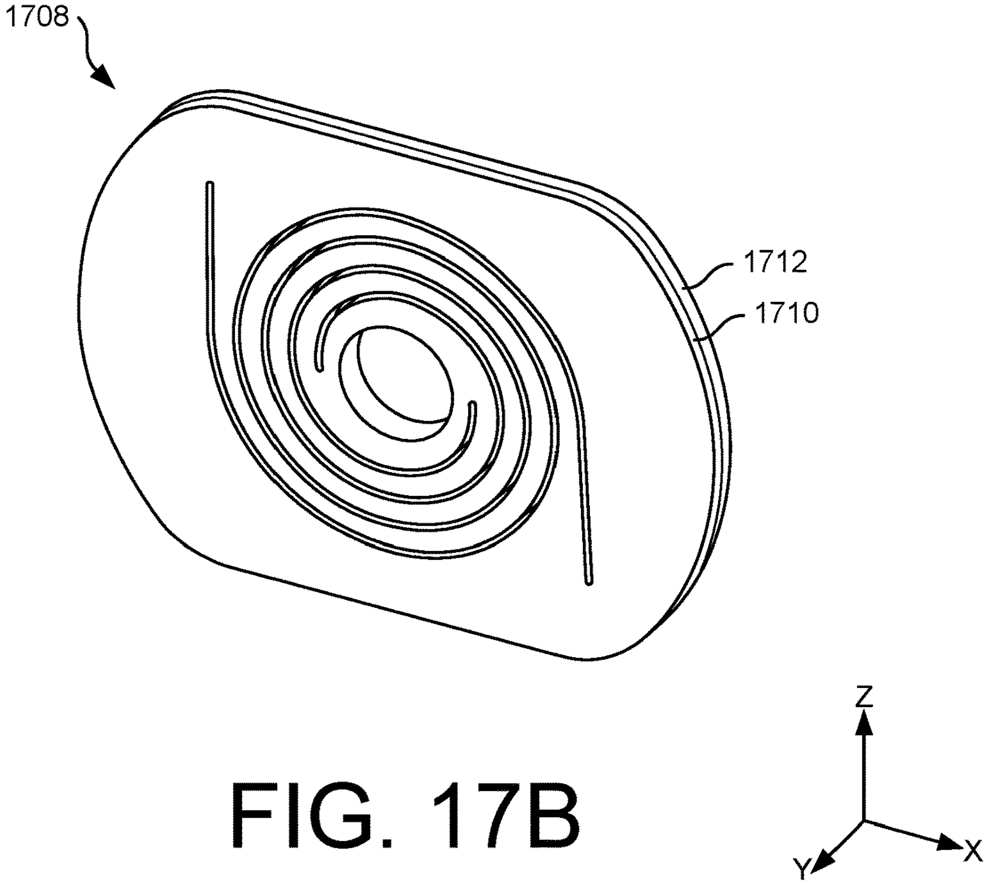
FIG. 17B illustrates a second example of a flexural spring, according to examples of the present disclosure.

FIGS. 17A-17C illustrate details of example flexural springs, according to examples of the present disclosure. In some instances, the flexural springs may be representative of the first flexural spring 118 and/or the second flexural spring 120 discussed hereinabove.

In FIG. 17A, a first flexural spring 1700 is shown. In some instances, the first flexural spring 1700 includes a first layer 1702, a second layer 1704, and a third layer 1706. The first layer 1702 may be a pressure sensitive adhesive (PSA) or a layer applied as a liquid, the second layer 1704 may be metal (it could also be non-metal, such as PEEK, PEN, PEI, etc.) that includes a flexure spring, and the third layer 1706 may be a PSA or a layer applied as a liquid. As such, the second layer 1704 may be disposed between the first layer 1702 and the third layer 1706. Each of the first layer 1702 and the third layer 1706 includes a cutout that is the same as that for the flexure spring formed in the second layer 1704. It is also possible to avoid cutouts in the damping layers if they have sufficient strain capability for the design excursion. Moreover, the first layer 1702, the second layer 1704, and the third layer 1706 include the opening for accommodating a post. In some instances, a thickness or material chosen for the first layer 1702, the second layer 1704, and/or the third layer 1706 is the same, or different, than one another.

In FIG. 17B, a second flexural spring 1708 is shown. In some instances, the second flexural spring 1708 includes a first layer 1710 and a second layer 1712. The first layer 1710 may be metal (it could also be non-metal, such as PEEK, PEN, PEI, etc.) that includes a flexure spring and the second layer 1712 may be PSA. The second layer 1712 includes a cutout that is the same as for the flexure spring formed in the first layer 1710. Moreover, the first layer 1710 and the second layer 1712 include an opening for accommodating a post. In some instances, a thickness of the first layer 1710 and the second layer 1712 is the same, or different, than one another.

In FIG. 17C, a third flexural spring 1714 is shown. In some instances, the third flexural spring 1714 includes a first layer 1716, a second layer 1718, and a third layer 1720. The first layer 1716 may be metal (it could also be non-metal, such as PEEK, PEN, PEI, etc.) that includes a flexure spring, the second layer 1718 may be a PSA, and the third layer 1720 may be metal (it could also be non-metal) that includes a flexure spring. The second layer 1718 includes a cutout that is the same as for the flexure spring formed in the first layer 1716 and for the flexure spring formed in the third layer 1720. Moreover, the first layer 1716, the second layer 1718, and the third layer 1720 include the opening for accommodating a post.

In some instances, a thickness of the first layer 1716, the second layer 1718, and/or the third layer 1720 is the same, or different, than one another. In some instances, the flexural spring formed in the first layer 1716 is oriented similarly, or differently, than the flexural spring formed in the third layer 1720. Moreover, the flexure spring formed in the first layer 1716 may be the same as, or different than, the flexure spring formed in the third layer 1720. In some instances, the flexure springs used in conjunction with the first post 114 and the second post 116 may be similar or different.

In some instances, the use of a PSA may provide dampening to avoid audible noise and/or mechanical resonance. For example, the PSA may dampen movement imparted to the first flexural spring 1700, the second flexural spring 1708, and/or the third flexural spring 1714. The PSA may also adhere the first flexural spring 1700, the second flexural spring 1708, and/or third flexural spring 1714 to the frame 204. Suitable materials for the first flexural spring 1700, the second flexural spring 1708, and/or third flexural spring 1714 include beryllium-copper, titanium alloys, spring steel, etc. In some instances, the metal layers of the first flexural spring 1700, the second flexural spring 1708, and/or third flexural spring 1714 may be 0.4 mm thick (e.g., in the Y-direction), and/or the PSA layers may be 0.2 mm thick (e.g., in the Y-direction).

FIG. 18 illustrates additional flexural spring designs that may be embodied within the actuator 102, according to examples of the present disclosure, and shows some of the design freedoms available to tailor the flexural spring performance to achieve the design targets. The top row shows instances with a different number of interlaced spirals. The $2^{nd}$ row from top shows examples of different slot widths. The $3^{rd}$ row shows racetrack spirals with uniform vs. variable track spacing. The bottom row shows examples of prior art flexures which have been used for decades in reciprocating machines but were found to be significantly inferior for the present application due to issues such as excessively high mechanical stresses or an undesirable ratio of radial to axial stiffness.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A device comprising:
- an audio transducer including an actuator having:
  - a voice-coil including a first surface and a second surface,
  - a first magnetic assembly disposed adjacent to the first surface, the first magnetic assembly including a first magnetic element and a second magnetic element,
  - a second magnetic assembly disposed adjacent to the second surface, the second magnetic assembly including a third magnetic element and a fourth magnetic element,
  - a first post coupled to the voice-coil,
  - a second post coupled to the voice-coil,
  - a first flexure coupled to the first post, wherein the first flexure includes:
    - a first layer comprising a first metal flexure spring, and
    - a second layer comprising pressure sensitive adhesive, and
  - a second flexure coupled to the second post, wherein the second flexure includes:
    - a third layer comprising a second metal flexure spring, and
    - a fourth layer comprising pressure sensitive adhesive; and
- a housing in which the audio transducer is at least partially disposed,
  - wherein the first magnetic assembly includes:
    - a first plate,
    - a first arm extending from the first plate in a first direction, and
    - a second arm extending from the first plate in a second direction opposite the first direction; and
  - wherein the second magnetic assembly includes:
    - a second plate,
    - a third arm extending from the second plate in a third direction, and
    - a fourth arm extending from the second plate in a fourth direction opposite the third direction.

2. The device of claim 1, further comprising a frame including:
- a first receptacle in which the first arm is at least partially disposed;
- a second receptacle in which the second arm is at least partially disposed;
- a third receptacle in which the third arm is at least partially disposed; and
- a fourth receptacle in which the fourth arm is at least partially disposed.

3. The device of claim 1, wherein:
- a first magnetic flux flows from the first magnetic element to the third magnetic element; and
- a second magnetic flux flows from the fourth magnetic element to the second magnetic element.

4. The device of claim 1, further comprising a former having the voice-coil, wherein:
- the first post couples to the former; and
- the second post couples to the former.

5. An audio transducer comprising:
- a frame; and
- a voice-coil at least partially disposed within the frame, the voice-coil including:
  - a first substantially flat side,
  - a second substantially flat side, and
- an actuator at least partially coupled to the frame, the actuator including:
  - a first magnetic element disposed adjacent to the first substantially flat side of the voice-coil,
  - a second magnetic element disposed adjacent to the first substantially flat side of the voice-coil,
  - a third magnetic element disposed adjacent to the second substantially flat side of the voice-coil, wherein a first magnetic flux flows from the first magnetic element to the third magnetic element,
  - a fourth magnetic element disposed adjacent to the second substantially flat side of the voice-coil, wherein a second magnetic flux flows from the fourth magnetic element to the second magnetic element,
  - a first plate having the first magnetic element and the second magnetic element, the first plate having a first arm and a second arm extending from opposite ends thereof, and a second plate having the third magnetic element and the fourth magnetic element, the second plate having a third arm and a fourth arm extending from opposite ends thereof.

6. The audio transducer of claim 5, wherein:
the frame includes:
a first receptacle in which the first arm is at least partially disposed,
a second receptacle in which the second arm is at least partially disposed,
a third receptacle in which the third arm is at least partially disposed, and
a fourth receptacle in which the fourth arm is at least partially disposed.

7. The audio transducer of claim 5, wherein:
a first distance is disposed between the first magnetic element and the voice-coil;
a second distance is disposed between the second magnetic element and the voice-coil;
a third distance is disposed between the third magnetic element and the second substantially flat side;
a fourth distance is disposed between the fourth magnetic element and the second substantially flat side; and
the first distance, the second distance, the third distance, and the fourth distance are substantially similar.

8. The audio transducer of claim 5, further comprising:
a first flexural spring coupled to the voice-coil; and
a second flexural spring coupled to the voice-coil.

9. The audio transducer of claim 8, further comprising:
a former to which the voice-coil couples;
a first post coupled to a first side of the former; and
a second post coupled to a second side of the former,
wherein the first flexural spring couples to the first post and the frame, and
wherein the second flexural spring couples to the second post and the frame.

10. The audio transducer of claim 9, wherein the former includes a top defining one or more tabs, further comprising a cone including having one or more slots through the one or more tabs are disposed, respectively.

11. The audio transducer of claim 8, wherein at least one of:
the first flexural spring includes a first metal layer and one or more first dampening layers; or
the second flexural spring includes a second metal layer and one or more second dampening layers.

12. The audio transducer of claim 5, wherein the voice-coil comprises a flat coil.

13. An actuator comprising:
at least one voice-coil;
a first magnetic element disposed adjacent to a first side of the at least one voice-coil;
a second magnetic element disposed adjacent to the first side of the at least one voice-coil;
a third magnetic element disposed adjacent to a second side of the at least one voice-coil;
a fourth magnetic element disposed adjacent to the second side of the at least one voice-coil;
a first flexural spring coupled to the at least one voice-coil;
a second flexural spring coupled to the at least one voice-coil;
a first plate having a first arm and a second arm extending therefrom in opposite directions, the first magnetic element and the second magnetic element being disposed on the first plate; and
a second plate having a third arm and a fourth arm extending therefrom in opposite directions, the third magnetic element and the fourth magnetic element being disposed on the second plate.

14. The actuator of claim 13, further comprising a frame, wherein:
the first flexural spring couples to the frame; and
the second flexural spring couples to the frame.

15. The actuator of claim 13, wherein:
the at least one voice-coil includes a first track and a second track;
the first track is disposed between the first magnetic element and the third magnetic element; and
the second track is disposed between the second magnetic element and the fourth magnetic element.

16. The actuator of claim 13, further comprising a frame including a first receptacle and a second receptacle disposed on a first side of the frame, and a third receptacle and a fourth receptacle disposed on a second side of the frame, wherein:
the first arm is at least partially disposed in the first receptacle;
the second arm is at least partially disposed in the second receptacle;
the third arm is at least partially disposed in the third receptacle; and
the fourth arm is at least partially disposed in the fourth receptacle.

17. The actuator of claim 13, wherein:
the first flexural spring includes at least one dampening layer; and
the second flexural spring includes at least one dampening layer.

* * * * *